(12) United States Patent
Kato

(10) Patent No.: US 11,448,428 B2
(45) Date of Patent: Sep. 20, 2022

(54) REFRIGERATION CYCLE DEVICE

(71) Applicant: DENSO CORPORATION, Kariya (JP)

(72) Inventor: Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 16/749,723

(22) Filed: Jan. 22, 2020

(65) Prior Publication Data
US 2020/0158381 A1 May 21, 2020

Related U.S. Application Data

(63) Continuation of application No. PCT/JP2018/025541, filed on Jul. 5, 2018.

(30) Foreign Application Priority Data

Jul. 31, 2017 (JP) .............................. JP2017-148189

(51) Int. Cl.
*F25B 5/04* (2006.01)
*F25B 25/00* (2006.01)
(Continued)

(52) U.S. Cl.
CPC .............. *F25B 5/04* (2013.01); *F25B 25/005* (2013.01); *F25B 43/043* (2013.01); *F25B 49/022* (2013.01); *F25B 2400/0409* (2013.01)

(58) Field of Classification Search
CPC ......... B60H 1/32284; B60H 1/22; F25B 5/02; F25B 9/008; F25B 29/003; F25B 43/006;
(Continued)

(56) References Cited

U.S. PATENT DOCUMENTS

2005/0061497 A1* 3/2005 Amaral .............. B60H 1/00278
165/202
2013/0312447 A1* 11/2013 Inaba .................... B60H 1/3223
62/324.6
(Continued)

FOREIGN PATENT DOCUMENTS

CN  103348198 A  10/2013
CN  105026195 A  11/2015
(Continued)

OTHER PUBLICATIONS

Translation of DE 102004007932 A1 Muramatsu et al. Heat Pump Type Hot Water Supply System With Cooling Function For E.g. Bathtub, Has Brine Circuit Having Brine Heat Exchanger Facilitating Heat Exchange Between Brine And Low Pressure Coolant That Flows In Second Refrigerating Circuit, (Year: 2004).*

*Primary Examiner* — Emmanuel E Duke
(74) *Attorney, Agent, or Firm* — Harness, Dickey & Pierce, P.L.C.

(57) ABSTRACT

A refrigeration cycle device includes a compressor, a heater device, a high-stage side decompressor, a gas-liquid separator, a refrigerant branch portion, a first decompressor, a first evaporator, a second decompressor, and a second evaporator. The compressor has an intermediate pressure port through which an intermediate-pressure refrigerant flows into the compressor. The gas-liquid separator is configured to separate the intermediate-pressure refrigerant into a gas refrigerant and a liquid refrigerant. The refrigerant branch portion is configured to divide a flow of the liquid refrigerant separated by the gas-liquid separator. In a cooling mode for cooling a heat exchange target fluid, a refrigerant circuit is switched such that a low-pressure refrigerant flows from the branch portion to the first evaporator. In a heating mode for heating the heat exchange target fluid, the refrigerant circuit is switched such that the low-pressure refrigerant flows from the branch portion to the second evaporator.

9 Claims, 4 Drawing Sheets

(51) Int. Cl.
*F25B 43/04* (2006.01)
*F25B 49/02* (2006.01)

(58) Field of Classification Search
CPC ........ F25B 2400/13; F25B 5/04; F25B 5/005;
F25B 43/043; F25B 49/02; F25B
2400/0409; F25B 2400/23; F25B 41/385;
F25B 41/39; F25B 2339/047
See application file for complete search history.

(56) References Cited

U.S. PATENT DOCUMENTS

| | | | |
|---|---|---|---|
| 2014/0208785 A1* | 7/2014 | Wallace | F25B 49/02 |
| | | | 62/115 |
| 2014/0290296 A1* | 10/2014 | Katoh | B60H 1/3227 |
| | | | 62/238.7 |
| 2016/0001634 A1* | 1/2016 | Terada | B60H 1/00007 |
| | | | 62/160 |
| 2016/0222965 A1* | 8/2016 | Ohno | F04C 29/12 |
| 2016/0258662 A1* | 9/2016 | Zimmermann | F25B 49/022 |
| 2016/0297283 A1* | 10/2016 | Sakamoto | F25B 47/02 |
| 2017/0203635 A1* | 7/2017 | Kuroda | F25B 41/20 |
| 2017/0205120 A1* | 7/2017 | Ali | F25B 40/00 |
| 2018/0222286 A1* | 8/2018 | Blatchley | H01M 10/6567 |

FOREIGN PATENT DOCUMENTS

| | | | | |
|---|---|---|---|---|
| DE | 102004007932 A1 * | 9/2004 | | F25B 9/008 |
| JP | 2012181005 A | 9/2012 | | |
| WO | WO-2016059791 A1 | 4/2016 | | |

* cited by examiner

REFRIGERATION CYCLE DEVICE

CROSS REFERENCE TO RELATED APPLICATION

The present application is a continuation application of International Patent Application No. PCT/JP2018/025541 filed on Jul. 5, 2018, which designated the U.S. and claims the benefit of priority from Japanese Patent Application No. 2017-148189 filed on Jul. 31, 2017. The entire disclosures of all of the above applications are incorporated herein by reference.

TECHNICAL FIELD

The present disclosure relates to a refrigeration cycle device.

BACKGROUND

A gas injection cycle is known as one of conventional refrigeration cycle devices.

A general refrigeration cycle switches a refrigerant circuit in accordance with a mode change between a heating mode and a cooling mode. An exterior heat exchanger functions as a radiator in the heating mode, and functions as an evaporator in the cooling mode.

The refrigeration cycle described may be constituted by a gas injection cycle. In the heating mode, a refrigerant having flowed from a high-stage side expansion valve is separated into gas and liquid by a gas-liquid separator, and an intermediate-pressure refrigerant in a gas-phase state thus produced is introduced into a compressor.

SUMMARY

A refrigeration cycle device according to an aspect of the present disclosure includes a compressor, a heater device, a high-stage side decompressor, a gas-liquid separator, a refrigerant branch portion, a first decompressor, a first evaporator, a second decompressor, and a second evaporator. The compressor is configured to compress a low-pressure refrigerant drawn from a suction port such that the low-pressure refrigerant becomes a high-pressure refrigerant and to discharge the high-pressure refrigerant from a discharge port. The compressor has an intermediate pressure port through which an intermediate-pressure refrigerant in a cycle flows into the compressor and joins the refrigerant in a compression process. The heater device is configured to heat a heat exchange target fluid using the high-pressure refrigerant discharged from the discharge port of the compressor as a heat source. The high-stage side decompressor is configured to decompress the high-pressure refrigerant flowing out of the heater device such that the high-pressure refrigerant becomes the intermediate-pressure refrigerant. The gas-liquid separator is configured to separate the intermediate-pressure refrigerant decompressed at the high-stage side decompressor into a gas refrigerant and a liquid refrigerant and allow the gas-refrigerant to flow to the intermediate pressure port of the compressor. The refrigerant branch portion is configured to divide a flow of the liquid refrigerant separated by the gas-liquid separator into one flow and another flow. The first decompressor is configured to decompress the liquid refrigerant of the one flow such that the liquid refrigerant becomes the low-pressure refrigerant. The first evaporator is configured to evaporate the low-pressure refrigerant decompressed by the first decompressor by allowing the low-pressure refrigerant to absorb heat of the heat exchange target fluid and allow the evaporated refrigerant to flow to the suction port of the compressor. The second decompressor is configured to decompress the liquid refrigerant of the other flow such that the liquid refrigerant becomes the low-pressure refrigerant. The second evaporator is configured to evaporate the low-pressure refrigerant decompressed by the second decompressor by allowing the low-pressure refrigerant to absorb heat of an external heat source and allow the evaporated refrigerant to flow to the suction port of the compressor. In a cooling mode for cooling the heat exchange target fluid, a refrigerant circuit is switched such that the low-pressure refrigerant flows from the refrigerant branch portion into the first evaporator. In a heating mode for heating the heat exchange target fluid, the refrigerant circuit is switched such that the low-pressure refrigerant flows from the refrigerant branch portion into the second evaporator.

EMBODIMENTS

In a gas injection cycle, the gas-phase refrigerant produced by gas-liquid separation using a gas-liquid separator needs to be introduced into the compressor, while the liquid-phase refrigerant produced by the separation needs to be supplied to the evaporator. The gas-liquid separator therefore needs to be disposed between the high-stage side expansion valve and the heat exchanger functioning as the evaporator.

However, if high pressure and low pressure of the exterior heat exchanger are configured to switch in accordance with an operation mode, it may be difficult to introduce the intermediate-pressure refrigerant in the gas-phase state into the compressor in the cooling mode, in which condition a gas injection cycle may be difficult to produce.

Moreover, such a configuration which is made to produce a gas injection cycle in any operation mode by adding refrigerant piping and switching the refrigerant circuit may increase complexity of the refrigerant circuit.

The present disclosure has been developed in consideration of these points. An object of the present disclosure is to simplify a circuit configuration of a refrigeration cycle device which includes a gas injection cycle having switchable operation modes.

A plurality of embodiments for practicing the present disclosure will be hereinafter described with reference to the drawings. In the respective embodiments, parts corresponding to matters already described in the preceding embodiments are given reference numbers identical to those of the matters already described. The same description is therefore omitted depending on circumstances. When only a part of a configuration is described in any of the embodiments, the remaining part of this configuration described in other preceding embodiments may be applied to the corresponding embodiment. Not only combinations of parts expressly and specifically described in the each of the embodiments as allowable combinations, but also combinations of parts not expressly described in each of the embodiments may be made as long as no particular problems are produced by the respective combinations.

Embodiments according to the present disclosure are hereinafter described with reference to the drawings. In the embodiments described hereinafter, identical or equivalent parts in the figures are given identical reference numbers.

First Embodiment

A refrigeration cycle device 10 according to a first embodiment will be initially described. The refrigeration cycle device 10 is applied to a vehicle air conditioner 1 for an electric vehicle which receives vehicle traveling driving force from a traveling electric motor. The refrigeration cycle device 10 in the vehicle air conditioner 1 has a function of cooling or heating blown air supplied to a vehicle interior which is an air conditioning target space.

Figure 1:
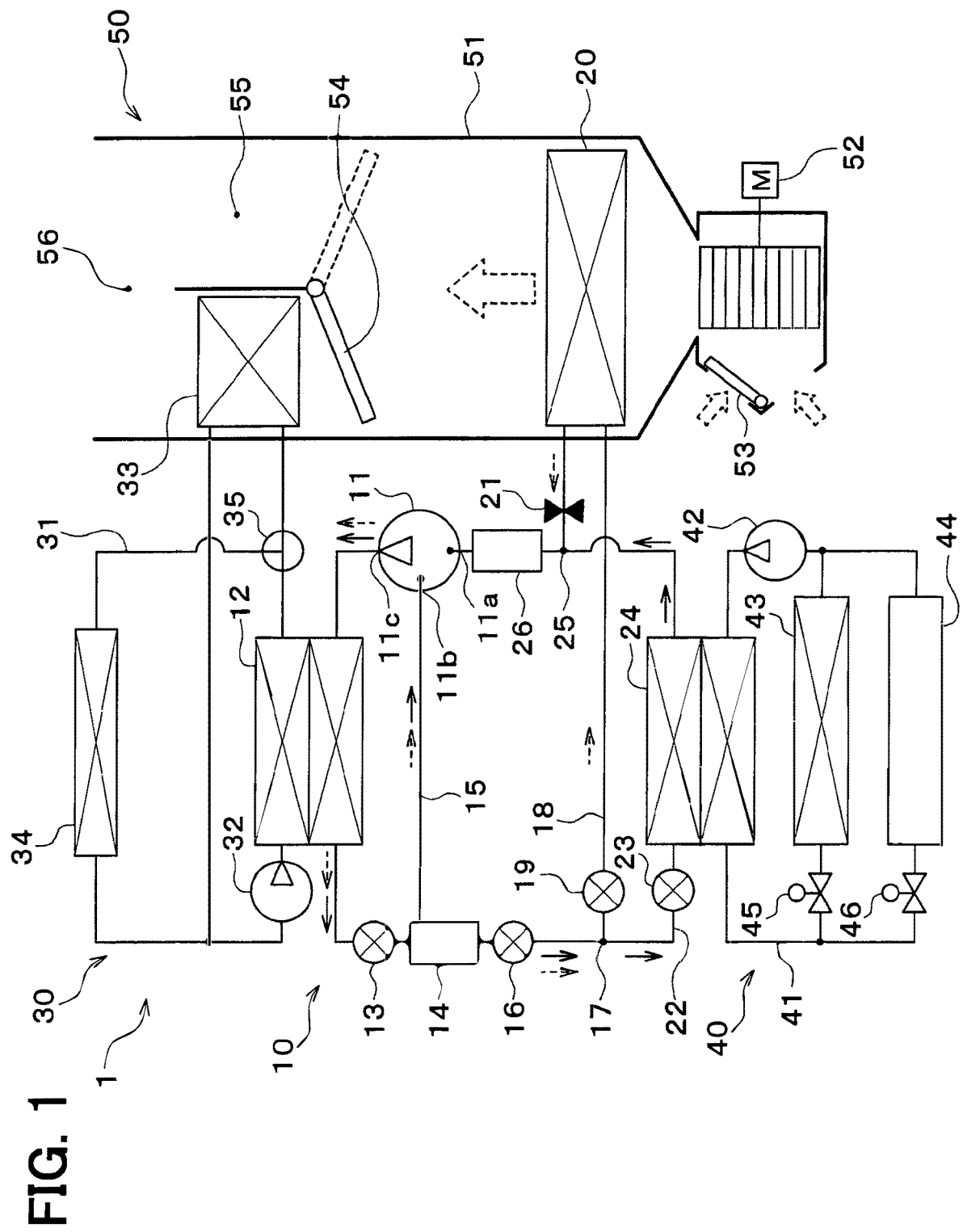
FIG. 1 is a schematic configuration diagram of a refrigeration cycle device according to at least one embodiment of the present disclosure.

Accordingly, as shown in FIG. 1, the refrigeration cycle device 10 according to the first embodiment is configured to switch between a plurality of operation modes including a cooling mode for cooling the vehicle interior and a heating mode for heating the vehicle interior.

In the first embodiment, the blown air supplied to the vehicle interior corresponds to heat exchange target fluid of the present disclosure. The cooling mode corresponds to a cooling mode of the present disclosure, while the heating mode corresponds to a heating mode of the present disclosure. In FIG. 1, a flow of the refrigerant in the heating mode is indicated by solid arrows, while a flow of the refrigerant in the cooling mode is indicated by broken arrows.

According to the refrigeration cycle device 10, a hydrofluorocarbon (HFC)-based refrigerant (more specifically, R134a) is adopted as the refrigerant and a vapor-compression type subcritical refrigeration cycle is constituted in which a high-pressure side refrigerant pressure does not exceed a critical pressure of the refrigerant. Needless to say, a hydrofluoroolefin (HFO)-based refrigerant (e.g., R1234yf) or the like may be adopted. Refrigerating machine oil for lubricating a compressor 11 is mixed in this refrigerant. A part of the refrigerating machine oil circulates in a cycle together with the refrigerant.

The refrigeration cycle device 10 according to the first embodiment includes a gas injection cycle (economizer type refrigeration cycle), a heating unit 30, and a heat medium circuit 40. The gas injection cycle of the refrigeration cycle device 10 is a cycle in which the compressor 11, a refrigerant radiator 12, a high-stage side expansion valve 13, a gas-liquid separator 14, a low-stage side fixed throttle 16, a first expansion valve 19, a first evaporator 20, an evaporation pressure control valve 21, a second expansion valve 23, a second evaporator 24, and a liquid storage unit 26 are connected.

The compressor 11 of the refrigeration cycle device 10 sucks, compresses, and discharges a refrigerant. The compressor 11 is disposed in a hood of the vehicle. The compressor 11 houses two compression mechanisms, i.e., a low-stage side compression mechanism and a high-stage side compression mechanism, and an electric motor which rotates both of the compression mechanisms in a housing constituting an outer case of the compressor 11. Accordingly, the compressor 11 is a two-stage boost type electric compressor.

A suction port 11a, an intermediate pressure port 11b, and a discharge port 11c are provided in the housing of the compressor 11. The suction port 11a is a suction opening through which a low-pressure refrigerant is sucked from an outside of the housing to the low-stage side compression mechanism. The discharge port 11c is a discharge opening through which a high-pressure refrigerant discharged from the high-stage side compression mechanism is discharged to the outside of the housing.

The intermediate pressure port 11b is an intermediate suction opening through which an intermediate-pressure refrigerant flows from the outside of the housing into the inside, and joins a refrigerant in a compression process from low pressure to high pressure. Accordingly, the intermediate pressure port 11b is connected to the discharge opening side of the low-stage side compression mechanism and the suction opening side of the high-stage side compression mechanism within the housing.

Operation (rotation speed) of the electric motor is controlled by a control signal output from a controller 60 described below. Accordingly, refrigerant discharge capacity of the compressor 11 changes under this rotation speed control.

The compressor 11 adopted in the first embodiment houses the two compression mechanisms in one housing. However, various other types of compressors may be adopted as long as they are two-stage boost compressors. More specifically, the compressor 11 may be an electric compressor which houses one fixed capacity type compression mechanism and an electric motor for rotating this compression mechanism in a housing as long as an intermediate-pressure refrigerant can enter through the intermediate pressure port 11b and join the refrigerant in the compression process from low pressure to high pressure.

Furthermore, the compressor 11 of one two-stage boost type may be produced by connecting a low-stage side compressor and a high-stage side compressor in series. According to this configuration, a suction opening of the low-stage side compressor disposed on the low stage side constitutes the suction port 11a, while a discharge opening of the high-stage side compressor disposed on the high stage side constitutes the discharge port 11c. In this case, the intermediate pressure port 11b is provided in a refrigerant path connecting the discharge port of the low-stage side compressor and the suction port of the high-stage side compressor.

The refrigerant inlet side of the refrigerant radiator 12 is connected to the discharge port 11c of the compressor 11. The refrigerant radiator 12 constitutes a part of the heating unit 30 provided as a heat medium circuit, and functions as a heat exchanger which exchanges heat between cooling water as a heat medium circulating in the heating unit 30, and a high-pressure refrigerant discharged from the high-stage side compression mechanism of the compressor 11.

Accordingly, the refrigerant radiator 12 functions as a medium refrigerant heat exchanger in the present disclosure. The refrigerant radiator 12 radiates heat of the high-pressure refrigerant discharged from the discharge port 11c of the compressor 11 to the heat medium circulating in the heating unit 30. A configuration of the heating unit 30, a specific configuration of the heat medium in the heating unit 30 and the like will be described in detail below.

The inlet side of the high-stage side expansion valve 13 is connected to the refrigerant outlet side of the refrigerant radiator 12. The high-stage side expansion valve 13 includes a valve body configured to change a throttle opening position, and an electric actuator which has a stepping motor for changing the throttle opening position of the valve body to constitute an electrically variable throttle mechanism.

The high-stage side expansion valve 13 is configured to set a throttling state achieving decompression, and a full-open state not achieving decompression.

Accordingly, the high-stage side expansion valve 13 can decompress the high-pressure refrigerant having flowed from the refrigerant radiator 12 until the high-pressure refrigerant becomes an intermediate-pressure refrigerant, and therefore functions as a high-stage side decompression unit in the present disclosure. Operation of the high-stage side expansion valve 13 is controlled by a control signal output from the controller 60.

A refrigerant flow inlet of the gas-liquid separator 14 is connected to a refrigerant outlet of the high-stage side expansion valve 13. The gas-liquid separator 14 is a gas-liquid separation unit which separates the refrigerator having flowed from the high-stage side expansion valve 13 in a two-phase state of gas and liquid into a gas-state refrigerant and a liquid-state refrigerant to function as a gas-liquid separation unit in the present disclosure.

More specifically, the gas-liquid separator 14 adopted herein is a centrifugal separation system (cyclone separator system) which separates a refrigerant having flowed into an internal space of a cylindrical main body into gas and liquid by utilizing an action of a centrifugal force generated by turning the refrigerant.

Furthermore, an internal volume of the gas-liquid separator 14 according to the first embodiment is set to such a volume that substantially no surplus refrigerant is stored even when a refrigerant circulation flow rate of the refrigerant circulating in the cycle changes as a result of a load change in the cycle.

One end of an intermediate pressure refrigerant path 15 is connected to a gas-phase refrigerant outlet of the gas-liquid separator 14. The other end of the intermediate pressure refrigerant path 15 is connected to the intermediate pressure port 11b of the compressor 11. Accordingly, the intermediate pressure refrigerant path 15 can lead, toward the intermediate pressure port 11b of the compressor 11, the intermediate-pressure refrigerant in the gas-phase state produced by gas-liquid separation using the gas-liquid separator 14.

A not-shown check valve is disposed in the intermediate pressure refrigerant path 15 to prevent backward flow of the refrigerant from the compressor 11 side to the gas-liquid separator 14 side. In this case, this check valve is only required to be disposed in the flow path from the gas-phase refrigerant outlet of the gas-liquid separator 14 to the intermediate pressure port 11b of the compressor 11. Accordingly, the check valve may be disposed either in the intermediate pressure port 11b of the compressor 11, or at a gas-phase refrigerant outlet of the gas-liquid separator 14.

Meanwhile, a refrigerant inlet of the low-stage side fixed throttle 16 is connected to a liquid-phase refrigerant outlet of the gas-liquid separator 14. The low-stage side fixed throttle 16 is constituted by a nozzle, an orifice, a capillary tube, or the like which has a fixed throttle opening position, and decompresses the liquid-phase refrigerant separated by the gas-liquid separator 14.

In case of the fixed throttle such as a nozzle or an orifice, a throttle path area rapidly decreases or rapidly increases. Accordingly, the flow rate of the refrigerant passing through the low-stage side fixed throttle 16 and the dryness of the refrigerant on the upstream side of the low-stage side fixed throttle 16 can be self-regulated (balanced) in accordance with a change of a pressure difference between the upstream side and the downstream side (pressure difference between inlet and outlet).

A refrigerant branch portion 17 is disposed at a refrigerant outlet of the low-stage side fixed throttle 16. The refrigerant branch portion 17 includes one refrigerant flow inlet and a plurality of refrigerant flow outlets, and branches a flow of the refrigerant flowing from the low-stage side fixed throttle 16 into a plurality of flows.

The refrigerant branch portion 17 according to the first embodiment has two refrigerant flow outlets. One of the refrigerant flow outlets of the refrigerant branch portion 17 is connected to a first parallel flow path 18, while the other is connected to a second parallel flow path 22. Accordingly, the refrigerant branch portion 17 branches the refrigerant flow having flowed from the low-stage side fixed throttle 16 into a refrigerant flow passing through the first parallel flow path 18 and a refrigerant flow passing through the second parallel flow path 22.

The first expansion valve 19, the first evaporator 20, and the evaporation pressure control valve 21 are disposed in the first parallel flow path 18. The first expansion valve 19 includes a valve body configured to change a throttle opening position, and an electric actuator for changing the opening position of the valve body to constitute an electrically variable throttle mechanism.

The first expansion valve 19 has a throttling function performing any refrigerant decompression by setting the valve opening position to an intermediate opening position, a full-opening function for fully opening the valve opening position to function as only a refrigerant path performing substantially no flow rate control and refrigerant decompression, and a full-closing function for fully closing the valve opening position to close the refrigerant path. Operation of the first expansion valve 19 is controlled by a control signal (control pulse) output from the controller 60. In this manner, the first expansion valve 19 can decompress the refrigerant having flowed into the first parallel flow path 18 until the refrigerant becomes a low-pressure refrigerant, and discharges the low-pressure refrigerant to function as a first decompression unit of the present disclosure. Furthermore, the first expansion valve 19 which is capable of controlling the flow rate of the refrigerant flowing toward the first parallel flow path 18 at the refrigerant branch portion 17 is also capable of achieving relative control of the flow rate of the refrigerant flowing toward the second parallel flow path 22.

The refrigerant inlet side of the first evaporator 20 is connected to a refrigerant flow outlet of the first expansion valve 19 via the first parallel flow path 18. As shown in FIG. 1, the first evaporator 20 is a heat exchanger disposed in an air conditioning case 51 of an interior air conditioning unit 50 described below, and cools blown air passing inside the air conditioning case 51 by evaporating the low-pressure refrigerant circulating inside the first evaporator 20 to cause heat absorption.

The inlet side of the evaporation pressure control valve 21 is connected to the refrigerant outlet side of the first evaporator 20 via the first parallel flow path 18. The evaporation pressure control valve 21 is constituted by a mechanical mechanism, and has a function of controlling a refrigerant evaporation pressure of the first evaporator 20 such that the refrigerant evaporation pressure becomes a reference pressure sufficient for reducing formation of frost or higher to reduce formation of frost on the first evaporator 20. In other words, the evaporation pressure control valve 21 has a function of controlling a refrigerant evaporation temperature of the first evaporator 20 such that the refrigerant evaporation temperature becomes a reference temperature sufficient for reducing formation of frost or higher.

The second parallel flow path 22 is connected to the other of the refrigerant flow outlets of the refrigerant branch portion 17. The second expansion valve 23 and the second evaporator 24 are disposed in the second parallel flow path 22. Similarly to the first expansion valve 19, the second expansion valve 23 includes a valve body configured to change a throttle opening position, and an electric actuator for changing the opening position of the valve body to constitute an electrically variable throttle mechanism.

Similarly to the first expansion valve 19, the second expansion valve 23 can perform the throttling function, the full-opening function, and the full-closing function by appropriately controlling the valve opening position from the full-open state to the full-close state. Operation of the second expansion valve 23 is controlled by a control signal (control pulse) output from the controller 60.

In this manner, the second expansion valve 23 can decompress the refrigerant having flowed into the second parallel flow path 22 until the refrigerant becomes a low-pressure refrigerant, and discharge the low-pressure refrigerant to function as a second decompression unit of the present disclosure. Furthermore, the second expansion valve 23 which is capable of controlling the flow rate of the refrigerant flowing toward the second parallel flow path 22 at the refrigerant branch portion 17 is also capable of achieving relative control of the flow rate of the refrigerant flowing toward the first parallel flow path 18.

The first expansion valve 19 and the second expansion valve 23 therefore cooperate with each other to perform a function of controlling the flow rate of the refrigerant passing through the first parallel flow path 18 and the second parallel flow path 22. Moreover, either the first expansion valve 19 or the second expansion valve 23 performs the full-closing function to perform a flow path switching function.

The refrigerant inlet side of the second evaporator 24 is connected to a refrigerant flow outlet of the second expansion valve 23 via the second parallel flow path 22. As shown in FIG. 1, the second evaporator 24 is a heat exchanger which constitutes a part of a heat medium circuit 40 described below, and absorbs heat of a heat medium (i.e., cooling water) circulating in the heat medium circuit 40 by evaporating the low-pressure refrigerant circulating inside the second evaporator 24 to cause heat absorption. A configuration and the like of the heat medium circuit 40 will be described in detail below.

As shown in FIG. 1, a refrigerant junction portion 25 has a plurality of refrigerant flow inlets and one refrigerant flow outlet, and joins flows of the plurality of refrigerants branched by the refrigerant branch portion 17 into one flow.

The refrigerant junction portion 25 according to the first embodiment has two refrigerant flow inlets. One of the refrigerant flow inlets of the refrigerant junction portion 25 is connected to the refrigerant flow outlet side of the evaporation pressure control valve 21, while the other is connected to the refrigerant outlet side of the second evaporator 24. Accordingly, the refrigerant junction portion 25 joins a refrigerant flow having passed through the first parallel flow path 18 and a refrigerant flow having passed through the second parallel flow path 22 into one refrigerant flow, and allows the joined refrigerant flow to flow out.

The liquid storage unit 26 is disposed at a refrigerant flow outlet of the refrigerant junction portion 25. The liquid storage unit 26 is a low-pressure side gas-liquid separator which separates the refrigerant having entered from the refrigerant junction portion 25 into gas and liquid, and accumulates surplus liquid-phase refrigerant in the cycle. The suction port 11a of the compressor 11 is connected to a gas-phase refrigerant outlet of the liquid storage unit 26. Accordingly, the liquid storage unit 26 performs a function of supplying the gas-phase refrigerant to the suction port 11a of the compressor 11 and reducing supply of the liquid-phase refrigerant, thereby preventing liquid compression of the refrigerant in the compressor 11.

A configuration of the heating unit 30 according to the first embodiment will be next described with reference to FIG. 1. As shown in FIG. 1, the heating unit 30 is a high-temperature side heat medium circuit which includes the refrigerant radiator 12 constituting a part of the gas injection cycle, a heat medium circulation path 31 as a heat medium flow path, a pressure pump 32, a heater core 33, a radiator 34, and a three-way valve 35.

The heating unit 30 is constituted by the refrigerant radiator 12, the heater core 33, and the like connected by the heat medium circulation path 31, and configured to circulate cooling water as a heat medium in the heat medium circulation path 31 by operation of the pressure pump 32. The cooling water in the heating unit 30 is a high-temperature heat medium, and constituted by a liquid containing at least ethylene glycol, dimethylpolysiloxane or a nanofluid, or an antifreeze liquid, for example.

The pressure pump 32 functions as a heat medium pump for sucking and discharging cooling water as a heat medium, and is constituted by an electric pump. The pressure pump 32 circulates cooling water in the heat medium circulation path 31 of the heating unit 30 by supplying cooling water in the heat medium circulation path 31 with pressure.

Operation of the pressure pump 32 is controlled by a control signal output from the controller 60. More specifically, the pressure pump 32 can control a flow rate of the cooling water circulating through the heating unit 30 under control by the controller 60 to function as a heat medium flow rate control unit in the heating unit 30.

The refrigerant radiator 12 is connected to a discharge opening side of the pressure pump 32. Accordingly, the refrigerant radiator 12 can radiate heat of the high-pressure refrigerant passing through the inside of the refrigerant radiator 12 to the cooling water circulating through the heat medium circulation path 31 by heat exchange between the high-pressure refrigerant and the cooling water.

The three-way valve 35 is connected to the cooling water flow outlet side of the refrigerant radiator 12. The three-way valve 35 has two flow outlets, and can switch a flow of the cooling water entering through one flow inlet to a flow toward either one of the flow outlets.

As shown in FIG. 1, the heater core 33 is connected to one of the flow outlets of the three-way valve 35, while the radiator 34 is connected to the other flow outlet. Accordingly, the three-way valve 35 can switch a flow of the cooling water having passed through the refrigerant radiator 12 to either the heater core 33 side or the radiator 34 side. The three-way valve 35 functions as a heat medium flow path switching unit in the heating unit 30.

As shown in FIG. 1, the heater core 33 is disposed on the blown air flow downstream side with respect to the first evaporator 20 in the air conditioning case 51 of the interior air conditioning unit 50. The heater core 33 is a high-temperature side heat medium heat exchanger which heats the blown air supplied to the vehicle interior by heat exchange between the cooling water circulating through the heat medium circulation path 31 of the heating unit 30 and the blown air.

In the heater core 33, the cooling water radiates heat by a sensible heat change to the blown air supplied to the vehicle interior. In this manner, the blown air supplied to the vehicle interior of the electric vehicle is heated. Accordingly, the refrigeration cycle device 10 achieves heating of the vehicle interior. In case of the heater core 33, the phase of the cooling water does not change from the liquid phase even after the cooling water radiates heat to the blown air.

The radiator 34 is a radiation heat exchanger for radiating heat of the cooling water circulating through the heat medium circulation path 31 of the heating unit 30 to the outside air outside the electric vehicle by heat exchange between the cooling water and the outside air. The radiator 34 is connected in parallel to the heater core 33 in the heat medium circulation path 31 of the heating unit 30. The heat of the cooling water is radiated to the outside air from the radiator 34. Accordingly, the refrigeration cycle device 10 can release heat to the outside of the vehicle interior without heating the blown air.

According to this configuration, the heating unit 30 of the refrigeration cycle device 10 can change a use mode of heat of the high-pressure refrigerant by switching a flow of the cooling water using the three-way valve 35. More specifically, the heating unit 30 can utilize the heat of the high-pressure refrigerant for heating the blown air, and thus can heat the vehicle interior by switchover to a cooling water flow which passes through the heater core 33. The heating unit 30 can also release the heat of the high-pressure refrigerant to the outside air by switchover to a cooling water flow which passes through the radiator 34.

A configuration of the heat medium circuit 40 according to the first embodiment will be subsequently described with reference to FIG. 1. As shown in FIG. 1, the heat medium circuit 40 is a low-temperature side heat medium circuit which includes the second evaporator 24 constituting a part of the gas injection cycle, a heat medium circulation path 41 as a heat medium flow path, a pressure pump 42, a radiator 43, an in-vehicle device 44, an on-off valve 45, and an on-off valve 46.

The heat medium circuit 40 is constituted by the second evaporator 24, the radiator 43, and the like connected by the heat medium circulation path 41, and configured to circulate cooling water as a heat medium in the heat medium circulation path 41 by operation of the pressure pump 42. The cooling water in the heat medium circuit 40 is a low-temperature heat medium, and constituted by a liquid containing at least ethylene glycol, dimethylpolysiloxane or a nanofluid, or an antifreeze liquid, for example.

The pressure pump 42 functions as a heat medium pump for sucking and discharging cooling water as a heat medium, and is constituted by an electric pump. The pressure pump 42 circulates the cooling water in the heat medium circulation path 41 of the heat medium circuit 40 by supplying the cooling water in the heat medium circulation path 41 with pressure.

Operation of the pressure pump 42 is controlled by a control signal output from the controller 60. More specifically, the pressure pump 42 can control a flow rate of the cooling water circulating through the heat medium circuit 40 under control by the controller 60 to function as a heat medium flow rate control unit in the heat medium circuit 40.

The second evaporator 24 is connected to a discharge opening side of the pressure pump 42. Accordingly, the second evaporator 24 can achieve heat exchange between the low-pressure refrigerant passing through the inside of the second evaporator 24 and the cooling water circulating through the heat medium circulation path 41 to causes the low-pressure refrigerant to absorb heat of the cooling water.

A heat medium path including the radiator 43 and the like, and a heat medium path including the in-vehicle device 44 and the like are connected to the cooling water flow outlet side of the second evaporator 24. Accordingly, in the heat medium circuit 40 of the first embodiment, the radiator 43 and the on-off valve 45 are connected in parallel to the in-vehicle device 44 and the on-off valve 46.

The radiator 43 is a heat exchanger which exchanges heat between the cooling water circulating through the heat medium circulation path 41 of the heat medium circuit 40 and the outside air outside the electric vehicle to cause the cooling water to absorb heat of the outside air. Accordingly, for circulation of the cooling water via the radiator 43, the heat medium circuit 40 utilizes the outside air outside the electric vehicle as an external heat source.

The on-off valve 45 is disposed on the cooling water flow upstream side of the cooling water flow inlet in the radiator 43. The on-off valve 45 is configured to control the opening position of the cooling water path toward the cooling water flow inlet of the radiator 43 between the full-close state and the full-open state. Operation of the on-off valve 45 is controlled by a control signal output from the controller 60.

More specifically, the heat medium circuit 40 can switch whether to supply a cooling water flow toward the radiator 43 by controlling the opening position of the on-off valve 45 using the controller 60. In other words, the refrigeration cycle device 10 can switch whether to use the outside air as an external heat source.

The in-vehicle device 44 is mounted on the electric vehicle, and constituted by a device which generates heat in accordance with operation. Examples of the in-vehicle device 44 include a charger for charging a battery of the electric vehicle, a motor generator, and an inverter. The in-vehicle device 44 functions as a heat generating device in the present disclosure. The heat medium circulation path 41 of the heat medium circuit 40 is so disposed as to come into contact with outer surfaces of respective parts of the in-vehicle devices 44, and configured to perform heat exchange between heat of the in-vehicle devices 44 and the cooling water flowing through the heat medium path.

The on-off valve 46 is disposed on the cooling water flow upstream side of the cooling water flow inlet of the in-vehicle device 44. The on-off valve 46 is configured to control the opening position of the cooling water path toward the cooling water flow inlet of the in-vehicle device 44 between the full-close state and the full-open state. Operation of the on-off valve 46 is controlled by a control signal output from the controller 60.

More specifically, the heat medium circuit 40 can switch whether to supply a cooling water flow toward the in-vehicle device 44 by controlling the opening position of the on-off valve 46 using the controller 60. In other words, the refrigeration cycle device 10 can switch whether to use the in-vehicle device 44 as an external heat source.

A configuration of the interior air conditioning unit 50 constituting the vehicle air conditioner 1 will be next described with reference to FIG. 1. The interior air conditioning unit 50 constitutes a part of the vehicle air conditioner 1, and supplies blown air temperature-controlled by the refrigeration cycle device 10 to the vehicle interior.

The interior air conditioning unit 50 is disposed inside an instrument panel at a foremost part of the vehicle interior of the electric vehicle. The interior air conditioning unit 50 accommodates a blower 52, the second evaporator 24, the heater core 33, and the like in an air path formed in the air conditioning case 51 constituting an outer case of the interior air conditioning unit 50.

The air conditioning case 51 constitutes an air path for the blown air supplied to the vehicle interior, and is made of resin having a certain degree of elasticity and excellent strength (e.g., polypropylene).

An inside-outside air switching device 53 is disposed on the blown air flow most upstream side of the air conditioning case 51. The inside-outside air switching device 53 switches between the inside air (vehicle interior air) and the outside air (air outside vehicle interior), and introduces the selected air into the air conditioning case 51.

Specifically, the inside-outside air switching device 53 continuously controls opening areas of an inside air introduction port through which the inside air is introduced into the air conditioning case 51, and of an outside air introduction port through which the outside air is introduced into the air conditioning case 51 by using an inside-outside air switching door to change an introduction ratio of an introduction air volume of the inside air to an introduction air volume of the outside air. The inside-outside air switching door is driven by an electric actuator for the inside-outside air switching door. Operation of the electric actuator is controlled by a control signal output from the controller 60.

The blower 52 is disposed on the blown air flow downstream side of the inside-outside air switching device 53. The blower 52 is an electric blower which drives a centrifugal multi-blade fan using an electric motor, and blows air sucked via the inside-outside air switching device 53 toward the vehicle interior. A rotation speed (i.e., blowing capacity) of the blower 52 is controlled by a control voltage output from the controller 60.

The first evaporator 20 and the heater core 33 are disposed in this order for a blown air flow on the blown air flow downstream side of the blower 52. Accordingly, the first evaporator 20 is disposed on the blown air flow upstream side with respect to the heater core 33.

A bypass path 55 is provided in the air conditioning case 51. The bypass path 55 is configured to guide the blown air having passed through the first evaporator 20 while bypassing the heater core 33.

An air mix door 54 is disposed on the blown air flow downstream side of the first evaporator 20 in the air conditioning case 51, and on the blown air flow upstream side of the heater core 33. The air mix door 54 is an air volume ratio control unit which controls an air volume ratio of the blown air passing through the heater core 33 to the blown air passing through the bypass path 55 after the blown air passes through the first evaporator 20.

The air mix door 54 is driven by an electric actuator for the air mix door. Operation of the electric actuator is controlled by a control signal output from the controller 60.

A junction space 56 is formed on the blown air flow downstream side of the heater core 33 and the bypass path 55. The junction space 56 is so formed as to join the blown air heated by heat exchange with the heat medium (i.e., cooling water) at the heater core 33, and the blown air passing through the bypass path 55 and not heated. Accordingly, the temperature of the blown air joined in the junction space 56 is controlled in accordance with the air volume ratio using the air mix door 54.

A plurality of types of not-shown opening holes are formed at a blown air flow most downstream portion of the air conditioning case 51. Specifically, the plurality of types of opening holes include a defroster opening hole, a face opening hole, and a foot opening hole, and configured such that the blown air temperature-controlled in the junction space 56 can be blown to the vehicle interior through the opening holes formed at different positions of the vehicle interior.

Moreover, a door is disposed on the blown air flow upstream side of each of the plurality of types of opening holes to control an opening area of the corresponding opening hole. Specifically, a defroster door, a face door, and a foot door are disposed in correspondence with the defroster opening hole, the face opening hole, and the foot opening hole, respectively. Operation of each of the doors is controlled by a control signal of the controller 60. The doors open and close the respective opening holes to constitute a blowing air mode switching device which switches a blowing air mode.

Figure 2:
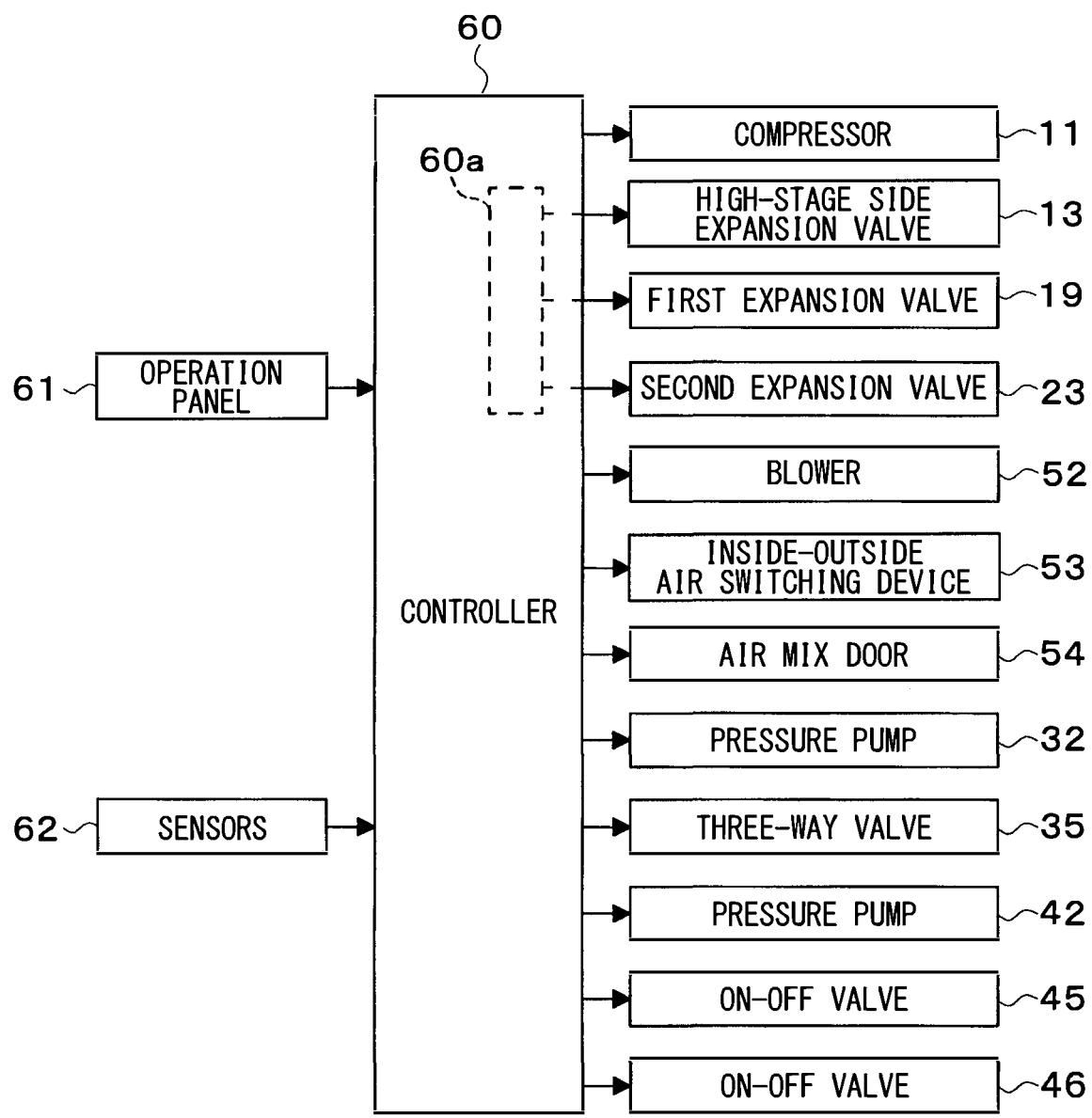
FIG. 2 is a control block diagram of the refrigeration cycle device according to at least one embodiment of the present disclosure.

A control system of the vehicle air conditioner 1 according to the first embodiment will be subsequently described with reference to FIG. 2. The controller 60 is constituted by a known microcomputer including components such as a central processing unit (CPU), a read-only memory (ROM), a random-access memory (RAM), and peripheral circuits of the microcomputer. The controller 60 performs various calculations and processing based on an air conditioning control program stored in the ROM, and controls operations of various air conditioning control devices connected to the output side.

A plurality of types of air conditioning control devices and electric actuators are connected on the output side of the controller 60. As shown in FIG. 2, the plurality of types of air conditioning control devices and the like include the compressor 11, the high-stage side expansion valve 13, the first expansion valve 19, the second expansion valve 23, the blower 52, the inside-outside air switching device 53, the air mix door 54, the pressure pump 32, the three-way valve 35, the pressure pump 42, the on-off valve 45, and the on-off valve 46.

An operation panel 61 through which various operations are input is connected to the input side of the controller 60. The operation panel 61 disposed in the vicinity of the instrument panel in the front region of the vehicle interior has various operation switches. Accordingly, operation signals output from the various operation switches of the operation panel 61 are input to the controller 60.

The various operation switches of the operation panel 61 include an auto switch, an operation mode selector switch, an air volume setting switch, a temperature setting switch, a blowing mode selector switch, and others. Accordingly, the refrigeration cycle device 10 is capable of appropriately switching the operation mode of the refrigeration cycle device 10 in accordance with input received through the operation panel 61.

Sensors 62 for air conditioning control are connected to the input side of the controller 60. The sensors 62 for air conditioning control include an inside air temperature sensor, an outside air temperature sensor, a solar radiation sensor, and others. The inside air temperature sensor is an inside air temperature detection unit which detects a temperature inside the vehicle interior (inside air temperature). The outside air temperature sensor is an outside air temperature detection unit which detects a temperature outside the vehicle interior (outside air temperature). The solar radiation sensor is a solar radiation amount detection unit which detects an amount of solar radiation entering the vehicle interior.

Accordingly, detection signals from the sensors 62 for air conditioning control are input to the controller 60. In this manner, the refrigeration cycle device 10 can control the temperature and the like of the blown air supplied to the vehicle interior in accordance with physical quantities detected by the sensors 62 for air conditioning control, and therefore achieves comfortable air conditioning.

The controller 60 includes control units formed integrally with each other for controlling operations of the various control devices connected to the output side of the controller 60. In this case, configurations controlling operations of the respective control devices (e.g., software and hardware) each constitute a control unit for controlling operation of the corresponding control device.

For example, a configuration which controls at least one of the high-stage side expansion valve 13, the first expansion valve 19, and the second expansion valve 23 constitutes a flow amount ratio control unit 60a for controlling a refrigerant flow amount ratio in each operation mode. In the first embodiment, the refrigerant flow amount ratio is defined as a ratio of an amount of the refrigerant sucked through the suction port 11a of the compressor 11 to an amount of the refrigerant discharged from the discharge port 11c of the compressor 11.

An operation of the vehicle air conditioner 1 configured as described above will be next described. Operation modes performed by the vehicle air conditioner 1 according to the first embodiment are a cooling mode, a heating mode, and a device cooling mode.

The cooling mode is an operation mode for cooling the vehicle interior by cooling the blown air, which is heat exchange target fluid, and corresponds to an example of a cooling mode in the present disclosure. The heating mode is an operation mode for heating the vehicle interior by absorbing heat from the outside air as an external heat source, and heating the blown air, which is heat exchange target fluid, and corresponds to an example of a heating mode in the present disclosure. The device cooling mode is an operation mode for cooling by absorbing heat from a heat generating device (i.e., in-vehicle device 44) as an external heat source.

An aspect of operation in the cooling mode of the vehicle air conditioner 1 according to the first embodiment will be initially described with reference to the drawings. In the cooling mode, each of the throttle opening positions of the high-stage side expansion valve 13 and the first expansion valve 19 is determined to become a predetermined opening position for the cooling mode. The throttle opening position of the second expansion valve 23 is determined to come into a full-close state. Accordingly, the refrigerant circuit is switched to a refrigerant circuit indicated by broken arrows in FIG. 1.

A control signal output to a servo motor of the air mix door 54 is determined such that the air mix door 54 closes the blown air flow upstream side of the heater core 33 to allow the whole flow amount of the blown air having passed through the first evaporator 20 to pass through the bypass path 55. Control signals for the compressor 11, the blower 52, and the inside-outside air switching device 53 are appropriately determined based on input operation of the operation panel 61 or detection signals of the sensors 62.

Accordingly, in the cooling mode of the refrigeration cycle device 10, the high-pressure refrigerant discharged from the discharge port 11c of the compressor 11 flows into the refrigerant radiator 12. The refrigerant having flowed into the refrigerant radiator 12 radiates heat to the cooling water flowing through the heat medium circulation path 31 of the heating unit 30. In this case, the cooling water in the heating unit 30 is heated by the heat of the high-pressure refrigerant. Accordingly, the refrigerant radiator 12 functions as a radiator.

The refrigerant flowing from the refrigerant radiator 12 is decompressed and expanded in an isenthalpic manner until the refrigerant becomes an intermediate-pressure refrigerant at the high-stage side expansion valve 13 in the throttling state. The intermediate-pressure refrigerant decompressed by the high-stage side expansion valve 13 is separated into gas and liquid at the gas-liquid separator 14.

The gas-phase refrigerant separated by the gas-liquid separator 14 flows into the intermediate pressure port 11b of the compressor 11 via the intermediate pressure refrigerant path 15, joins the refrigerant discharged from the low-stage side compression mechanism of the compressor 11, and is sucked into the high-stage side compression mechanism.

Meanwhile, the liquid-phase refrigerant separated by the gas-liquid separator 14 is decompressed by the low-stage side fixed throttle 16, and reaches the refrigerant branch portion 17. In the cooling mode, the first expansion valve 19 is in the throttling state, while the second expansion valve 23 is in the full-close state. Accordingly, the refrigerant flowing from the refrigerant branch portion 17 flows into the first parallel flow path 18, and is decompressed in an isenthalpic manner until the refrigerant becomes a low-pressure refrigerant at the first expansion valve 19.

The low-pressure refrigerant flowing from the first expansion valve 19 flows into the first evaporator 20 disposed in the air conditioning case 51, exchanges heat with the blown air supplied by the blower 52, and absorbs heat of the blown air. In this manner, the blown air supplied by the blower 52 is cooled, and supplied to the vehicle interior via the bypass path 55.

The refrigerant flowing from the first evaporator 20 flows into the liquid storage unit 26 via the evaporation pressure control valve 21 and the refrigerant junction portion 25, and is separated into gas and liquid. Thereafter, the gas-phase refrigerant separated at the liquid storage unit 26 is sucked through the suction port 11a of the compressor 11, and again compressed. Meanwhile, the liquid-phase refrigerant separated at the liquid storage unit 26 is stored in the liquid storage unit 26 as a surplus refrigerant not needed for performing refrigeration capacity required for the cycle.

An operation of the heating unit 30 in the cooling mode will be herein described. A control signal of the three-way valve 35 in the cooling mode is determined to produce a flow of the whole amount of the cooling water from the refrigerant radiator 12 into the radiator 34.

As described above, heat of the high-pressure refrigerant is radiated to the cooling water in the heating unit 30 in the refrigerant radiator 12. Accordingly, the cooling water having flowed from the refrigerant radiator 12 passes through the three-way valve 35 while remaining in the high-temperature state, and flows into the radiator 34.

The heat of the cooling water having flowed into the radiator 34 is radiated through the radiator 34 to the outside air outside the electric vehicle. Accordingly, in case of the refrigeration cycle device 10, the heat of the high-pressure refrigerant is radiated to the outside air via the cooling water in the heating unit 30.

Thereafter, the cooling water whose heat is radiated by the radiator 34 circulates in accordance with operation of the pressure pump 32, is again sucked into the pressure pump 32, and supplied to the refrigerant radiator 12 with pressure.

In the cooling mode, the low-pressure refrigerant in the refrigeration cycle device 10 does not pass through the second evaporator 24. Accordingly, any operating state of the heat medium circuit 40 thermally connected to the second evaporator 24 can be determined.

As described above, in the cooling mode, heat of the high-pressure refrigerant is radiated to the outside air via the cooling water in the heating unit 30, and also the low-pressure refrigerant is caused to absorb heat from the blown air supplied to the vehicle interior at the first evaporator 20 to cool the blown air. In this manner, cooling of the vehicle interior is achievable.

Furthermore, the cooling mode achieves suction of the low-pressure refrigerant flowing from the first evaporator 20 via the suction port 11a of the compressor 11, and also achieves junction between the refrigerant in the boosting process and the intermediate-pressure refrigerant in the gas-phase state having passed through the high-stage side expansion valve 13 and the gas-liquid separator 14 and flowing into the intermediate pressure port 11b. Accordingly, the refrigeration cycle device 10 can produce a gas injection cycle (economizer type refrigeration cycle) in the cooling mode.

Compression efficiency of the high-stage side compression mechanism therefore improves by sucking the mixed refrigerant having a low temperature into the high-stage side compression mechanism. In addition, by decreasing a pressure difference between the suction refrigerant pressure and the discharge refrigerant pressure of each of the low-stage side compression mechanism and the high-stage side compression mechanism, compression efficiency of both the compression mechanisms improves. Consequently, coefficient of performance (COP) of the entire refrigeration cycle device 10 improves.

An aspect of operation in the heating mode of the vehicle air conditioner 1 according to the first embodiment will be next described with reference to the drawings. In the heating mode, each of the throttle opening positions of the high-stage side expansion valve 13 and the second expansion valve 23 is determined to become a predetermined opening position for the heating mode. The throttle opening position of the first expansion valve 19 is determined to come into a full-close state. As a result, the refrigerant circuit is switched to a refrigerant circuit indicated by solid arrows in FIG. 1.

A control signal output to a servo motor of the air mix door 54 is determined such that the air mix door 54 closes the bypass path 55 to allow the whole flow amount of the blown air having passed through the first evaporator 20 to pass through the heater core 33. Control signals for the compressor 11, the blower 52, and the inside-outside air switching device 53 are appropriately determined based on input operation of the operation panel 61 or detection signals of the sensors 62.

Accordingly, in the heating mode of the refrigeration cycle device 10, the high-pressure refrigerant discharged from the discharge port 11c of the compressor 11 flows into the refrigerant radiator 12. The refrigerant having flowed into the refrigerant radiator 12 radiates heat to the cooling water flowing through the heat medium circulation path 31 of the heating unit 30. In this case, the cooling water in the heating unit 30 is heated by the heat of the high-pressure refrigerant. Accordingly, the refrigerant radiator 12 functions as a radiator.

In the heating mode, the refrigerant flowing from the refrigerant radiator 12 is similarly decompressed and expanded in an isenthalpic manner until the refrigerant becomes an intermediate-pressure refrigerant at the high-stage side expansion valve 13 in the throttling state. The intermediate-pressure refrigerant decompressed by the high-stage side expansion valve 13 is separated into gas and liquid at the gas-liquid separator 14.

The gas-phase refrigerant separated by the gas-liquid separator 14 flows into the intermediate pressure port 11b of the compressor 11 via the intermediate pressure refrigerant path 15, joins the refrigerant discharged from the low-stage side compression mechanism of the compressor 11, and is sucked into the high-stage side compression mechanism.

Meanwhile, the liquid-phase refrigerant separated by the gas-liquid separator 14 is decompressed by the low-stage side fixed throttle 16, and reaches the refrigerant branch portion 17. In the heating mode, the second expansion valve 23 is in the throttling state, while the first expansion valve 19 is in the full-close state. Accordingly, the refrigerant flowing from the refrigerant branch portion 17 flows into the second parallel flow path 22, and is decompressed in an isenthalpic manner until the refrigerant becomes a low-pressure refrigerant at the second parallel flow path 22.

The low-pressure refrigerant flowing from the second expansion valve 23 flows into the second evaporator 24, and exchanges heat with the cooling water circulating through the heat medium circuit 40. More specifically, at the second evaporator 24, the low-pressure refrigerant is heated by the heat absorbed from the cooling water in the heat medium circuit 40, while the cooling water in the heat medium circuit 40 is cooled by heat exchange with the low-pressure refrigerant.

The refrigerant flowing from the second evaporator 24 flows into the liquid storage unit 26 via the refrigerant junction portion 25, and is separated into gas and liquid. Thereafter, the gas-phase refrigerant separated at the liquid storage unit 26 is sucked through the suction port 11a of the compressor 11, and again compressed. Meanwhile, the liquid-phase refrigerant separated at the liquid storage unit 26 is stored in the liquid storage unit 26 as surplus refrigerant in the cycle.

An operation of the heating unit 30 in the heating mode will be herein described. A control signal of the three-way valve 35 in the heating mode is determined to produce a flow of the whole amount of the cooling water from the refrigerant radiator 12 into the heater core 33.

As described above, heat of the high-pressure refrigerant is radiated to the cooling water in the heating unit 30 in the refrigerant radiator 12. Accordingly, the cooling water having flowed from the refrigerant radiator 12 passes through the three-way valve 35 while remaining in the high-temperature state, and flows into the heater core 33.

The cooling water having flowed into the heater core 33 exchanges heat with the blown air supplied by the blower 52 at the heater core 33. In the heating mode, the first expansion valve 19 is in the full-close state, wherefore the blown air reaches the heater core 33 without cooling by the first evaporator 20.

According to the refrigeration cycle device 10, therefore, the heat of the high-pressure refrigerant is radiated, via the cooling water in the heating unit 30, to the blown air supplied to the vehicle interior. In this manner, the blown air heated by the heat of the high-pressure refrigerant can be supplied to the vehicle interior, wherefore heating of the vehicle interior can be achieved.

Thereafter, the cooling water having radiated heat at the heater core 33 circulates in accordance with operation of the pressure pump 32, is again sucked into the pressure pump 32, and supplied to the refrigerant radiator 12 with pressure.

An operation of the heat medium circuit 40 in the heating mode will be subsequently described. Control signals of the on-off valve 45 and the on-off valve 46 in the heating mode are determined to set the on-off valve 45 to the full-open state, and the on-off valve 46 to the full-close state, for example. In this case, the whole amount of the cooling water in the heat medium circuit 40 passes through the radiator 43, wherefore the cooling water absorbs heat from the outside air at the radiator 43. Accordingly, the refrigeration cycle device 10 in this case utilizes the outside air as an external heat source.

The cooling water caused to flow from the radiator 43 by operation of the pressure pump 42 flows into the second evaporator 24 via the pressure pump 42. As described above, heat is exchanged between the low-pressure refrigerant and the cooling water in the heat medium circuit 40 at the second evaporator 24. In this case, heat of the cooling water in the heat medium circuit 40 is absorbed by the low-pressure refrigerant. The refrigeration cycle device 10 therefore can utilize the outside air as the external heat source in the heating mode.

In the example described above, the on-off valve 45 is full-opened, and the on-off valve 46 is full-closed. In this case, the cooling water passes through the radiator 43. Accordingly, the outside air is utilized as the external heat source in the heating mode. However, various other modes may be adopted as use modes of the external heat source depending on on-off control of the on-off valve 45 and the on-off valve 46.

For example, in the full-close state of the on-off valve 45 and in the full-open state of the on-off valve 46, the cooling water passing through the in-vehicle device 44 absorbs heat of the in-vehicle device 44. In this case, the refrigeration cycle device 10 can use the in-vehicle device 44 as the external heat source in the heating mode.

In the full-open state of both the on-off valve 45 and the on-off valve 46, the cooling water joins after passing through the radiator 43 and the in-vehicle device 44. Accordingly, the cooling water absorbs heat of the outside air and the in-vehicle device 44. In this case, the refrigeration cycle device 10 can use both the outside air and the in-vehicle device 44 as the external heat source in the heating mode.

As described above, in the heating mode, the low-pressure refrigerant is caused to absorb heat of the external heat source (i.e., outside air or in-vehicle device 44) via the cooling water in the heat medium circuit 40, and heat of the high-pressure refrigerant is also radiated to the blown air supplied to the vehicle interior to heat the blown air via the cooling water in the heating unit 30. In this manner, heating of the vehicle interior is achievable.

Furthermore, in the heating mode, the high and low pressures on the Mollier diagram of the refrigerant radiator 12 and the like are not switched from the high and low pressures of the cooling mode. Accordingly, the low-pressure refrigerant having flowed from the second evaporator 24 is sucked via the suction port 11*a* of the compressor 11, and the intermediate-pressure refrigerant in the gas-phase state having passed through the high-stage side expansion valve 13 and the gas-liquid separator 14 is flowed into the intermediate pressure port 11*b* to join the refrigerant in the boosting process. In this case, the refrigeration cycle device 10 can produce a gas injection cycle (economizer type refrigeration cycle) not only in the cooling mode but also in the heating mode.

Compression efficiency of the high-stage side compression mechanism therefore improves by sucking the mixed refrigerant having a low temperature into the high-stage side compression mechanism. In addition, by decreasing a pressure difference between the suction refrigerant pressure and the discharge refrigerant pressure of each of the low-stage side compression mechanism and the high-stage side compression mechanism, compression efficiency of both the compression mechanisms improves. Consequently, coefficient of performance (COP) of the entire refrigeration cycle device 10 improves.

Furthermore, the controller 60 in the heating mode controls the throttle opening position of at least one of the high-stage side expansion valve 13, the first expansion valve 19, and the second expansion valve 23 such that the refrigerant flow amount ratio in the heating mode becomes smaller than the refrigerant flow amount ratio in the cooling mode.

The refrigerant flow amount ratio is herein defined as a ratio of an amount of the refrigerant sucked through the suction port 11*a* of the compressor 11 to an amount of the refrigerant discharged from the discharge port 11*c* of the compressor 11. The discharge refrigerant flow amount corresponds to the whole amount of the intermediate-pressure refrigerant flow amount introduced from the intermediate pressure port 11*b* and the discharge refrigerant flow amount. Accordingly, the discharge refrigerant flow amount is recognizable based on a ratio of the intermediate-pressure refrigerant flow amount to the discharge refrigerant flow amount.

In the heating mode, suction refrigerant density sucked from the suction port 11*a* is smaller than the corresponding suction refrigerant density in the cooling mode. In this case, heat exchange performance of the refrigerant radiator 12 improves by reducing the refrigerant flow amount ratio in the heating mode to a ratio smaller than the refrigerant flow amount ratio in the cooling mode, wherefore cycle performance improves. The controller 60 in this case functions as a flow amount ratio control unit of the present disclosure.

An aspect of operation in the device cooling mode of the vehicle air conditioner 1 according to the first embodiment will be subsequently described with reference to the drawings. In the device cooling mode, each of the throttle opening positions of the high-stage side expansion valve 13 and the second expansion valve 23 is determined to become a predetermined opening position for the device cooling mode. The throttle opening position of the first expansion valve 19 is determined to come into a full-close state. Accordingly, the refrigerant circuit is switched to the refrigerant circuit indicated by the solid arrows in FIG. 1 in the device cooling mode similarly to the heating mode.

Control signals for the compressor 11, the blower 52, the inside-outside air switching device 53, and the air mix door 54 are appropriately determined based on input operation of the operation panel 61 or detection signals of the sensors 62.

Accordingly, in the device cooling mode of the refrigeration cycle device 10, the high-pressure refrigerant discharged from the discharge port 11*c* of the compressor 11 flows into the refrigerant radiator 12. The refrigerant having flowed into the refrigerant radiator 12 radiates heat to the cooling water flowing through the heating unit 30. In this case, the cooling water in the heating unit 30 is heated by the heat of the high-pressure refrigerant. Accordingly, the refrigerant radiator 12 functions as a radiator.

In the device cooling mode, the refrigerant flowing from the refrigerant radiator 12 is similarly decompressed and expanded in an isenthalpic manner until the refrigerant becomes an intermediate-pressure refrigerant at the high-stage side expansion valve 13 in the throttling state. The intermediate-pressure refrigerant decompressed by the high-stage side expansion valve 13 is separated into gas and liquid at the gas-liquid separator 14.

The gas-phase refrigerant separated by the gas-liquid separator 14 flows into the intermediate pressure port 11b of the compressor 11 via the intermediate pressure refrigerant path 15, joins the refrigerant discharged from the low-stage side compression mechanism of the compressor 11, and is sucked into the high-stage side compression mechanism.

Meanwhile, the liquid-phase refrigerant separated by the gas-liquid separator 14 is decompressed by the low-stage side fixed throttle 16, and reaches the refrigerant branch portion 17. In the device cooling mode, the second expansion valve 23 is in the throttling state, while the first expansion valve 19 is in the full-close state similarly to the heating mode. Accordingly, the refrigerant having flowed from the refrigerant branch portion 17 flows into the second parallel flow path 22, and is decompressed in an isenthalpic manner until the refrigerant becomes a low-pressure refrigerant at the second expansion valve 23.

The low-pressure refrigerant flowing from the second expansion valve 23 flows into the second evaporator 24, and exchanges heat with the cooling water circulating through the heat medium circuit 40. More specifically, at the second evaporator 24, the low-pressure refrigerant is heated by the heat absorbed from the cooling water in the heat medium circuit 40, while the cooling water in the heat medium circuit 40 is cooled by heat exchange with the low-pressure refrigerant.

The refrigerant flowing from the second evaporator 24 flows into the liquid storage unit 26 via the refrigerant junction portion 25, and is separated into gas and liquid. Thereafter, the gas-phase refrigerant separated at the liquid storage unit 26 is sucked through the suction port 11a of the compressor 11, and again compressed. Meanwhile, the liquid-phase refrigerant separated at the liquid storage unit 26 is stored in the liquid storage unit 26 as surplus refrigerant in the cycle.

An operation of the heating unit 30 in the device cooling mode will be herein described. A control signal of the three-way valve 35 in the device cooling mode is determined to produce a flow of the whole amount of the cooling water from the refrigerant radiator 12 into the radiator 34.

As described above, heat of the high-pressure refrigerant is radiated to the cooling water in the heating unit 30 in the refrigerant radiator 12. Accordingly, the cooling water having flowed from the refrigerant radiator 12 passes through the three-way valve 35 while remaining in the high-temperature state, and flows into the radiator 34. The heat of the cooling water having flowed into the radiator 34 is radiated through the radiator 34 to the outside air of the electric vehicle.

Accordingly, in case of the refrigeration cycle device 10, the heat of the high-pressure refrigerant is radiated to the outside air via the cooling water in the heating unit 30.

Thereafter, the cooling water whose heat is radiated at the radiator 34 circulates in accordance with operation of the pressure pump 32, is again sucked into the pressure pump 32, and supplied to the refrigerant radiator 12 with pressure.

An operation of the heat medium circuit 40 in the device cooling mode will be subsequently described. Control signals of the on-off valve 45 and the on-off valve 46 in the device cooling mode are determined to set the on-off valve 45 to the full-close state, and the on-off valve 46 to the full-open state. In this case, the whole amount of the cooling water in the heat medium circuit 40 passes through the in-vehicle device 44, wherefore the cooling water absorbs heat from the in-vehicle device 44.

The cooling water having passed through the on-off valve 46 and the in-vehicle device 44 flows into the second evaporator 24 via the pressure pump 42. As described above, heat is exchanged between the low-pressure refrigerant and the cooling water in the heat medium circuit 40 at the second evaporator 24. In this case, heat of the cooling water in the heat medium circuit 40 is absorbed by the low-pressure refrigerant.

According to the refrigeration cycle device 10, therefore, heat of the in-vehicle device 44 generated by operation can be radiated to the outside of the electric vehicle via the cooling water in the heat medium circuit 40, the refrigerant of the refrigeration cycle device 10, and the cooling water in the heating unit 30. Accordingly, the refrigeration cycle device 10 which cools the in-vehicle device 44 generating heat in accordance with operation can adjust the temperature of the in-vehicle device 44 to a temperature in an appropriate temperature range, thereby reducing thermal runaway or failure of the in-vehicle device 44.

Furthermore, also in the device cooling mode, the high and low pressures on the Mollier diagram of the refrigerant radiator 12 and the like are not switched from the high and low pressures of the cooling mode and the heating mode. Accordingly, the low-pressure refrigerant flowing from the second evaporator 24 is sucked via the suction port 11a of the compressor 11, and the intermediate-pressure refrigerant in the gas-phase state having passed through the high-stage side expansion valve 13 and the gas-liquid separator 14 is flowed into the intermediate pressure port 11b to join the refrigerant in the boosting process.

In this case, the refrigeration cycle device 10 can produce a gas injection cycle (economizer type refrigeration cycle) not only in the cooling mode and the heating mode but also in the device cooling mode.

Compression efficiency of the high-stage side compression mechanism therefore improves by sucking the mixed refrigerant having a low temperature into the high-stage side compression mechanism. In addition, by decreasing a pressure difference between the suction refrigerant pressure and the discharge refrigerant pressure of each of the low-stage side compression mechanism and the high-stage side compression mechanism, compression efficiency of both the compression mechanisms improves. Consequently, coefficient of performance (COP) of the entire refrigeration cycle device 10 improves.

While the cooling mode, the heating mode, and the device cooling mode are presented as operation modes described above, the refrigeration cycle device 10 can implement other operation modes. A dehumidifying and heating mode is one of specific examples of the other operation modes.

In this case, heat is absorbed from the blown air at the first evaporator 20 by setting the opening position of each of the high-stage side expansion valve 13 and the first expansion valve 19 to a predetermined throttle opening position, and bringing the second expansion valve 23 into the full-close state. Simultaneously, the three-way valve 35 in the heating unit 30 is controlled such that the whole amount of cooling water having flowed from the refrigerant radiator 12 flows to the heater core 33, and the bypass path 55 is closed by the air mix door 54.

In this manner, the blown air supplied from the blower 52 is dehumidified by heat exchange at the first evaporator 20, and subsequently heated by the heater core 33 and supplied to the vehicle interior. Accordingly, dehumidification and heating of the vehicle interior is achievable. In this case, a gas injection cycle can be produced similarly to the respective operation modes described above.

According to the refrigeration cycle device 10 of the first embodiment described above, the first expansion valve 19 and the first evaporator 20 are connected to one side of the refrigerant branch portion 17, while the second expansion valve 23 and the second evaporator 24 are connected to the other side of the refrigerant branch portion 17.

In this case, the heating unit 30 radiates heat of the high-pressure refrigerant, while the first evaporator 20 and the second evaporator 24 causes the low-pressure refrigerant to absorb heat in any of the cooling mode, the heating mode, and the device cooling mode. According to the refrigeration cycle device 10, therefore, high and low pressures on the Mollier diagram for the refrigerant radiator 12 of the heating unit 30, the first evaporator 20, and the second evaporator 24 are not switched in accordance with the operation mode. Accordingly, the circuit configuration can be simplified.

Furthermore, the gas-liquid separator 14 is disposed between the high-stage side expansion valve 13 and the refrigerant branch portion 17 in the refrigeration cycle device 10. In this case, the gas-phase refrigerant produced by gas-liquid separation is guided to the intermediate pressure port 11b of the compressor 11 to produce a gas injection cycle.

The refrigeration cycle device 10 in which high and low pressures on the Mollier diagram are not switched in accordance with the operation mode can produce a gas injection cycle in any of the cooling mode, the heating mode, and the device cooling mode. In this case, performance improvement of the refrigeration cycle device 10 is achievable, such as improvement of compression efficiency of the compressor 11.

Accordingly, the refrigeration cycle device 10 can simplify the circuit configuration, and produce a gas injection cycle for each of the switchable operation modes, thereby improving cycle performance in each of the operation mode.

As shown in FIG. 1, the second evaporator 24 is configured to utilize the outside air as an external heat source by using the heat medium circuit 40. Accordingly, the refrigeration cycle device 10 can improve cycle performance in the heating mode by using the outside air as the external heat source.

Moreover, the second evaporator 24 is configured to utilize the in-vehicle device 44 as an external heat source by using the heat medium circuit 40.

Accordingly, the refrigeration cycle device 10 can improve cycle performance in the heating mode by using the in-vehicle device 44 as the external heat source.

Furthermore, heat of the in-vehicle device 44 is absorbed when the in-vehicle device 44 is used as an external heat source. In this case, the refrigeration cycle device 10 can achieve cooling of the in-vehicle device 44. Accordingly, the refrigeration cycle device 10 can prevent failure or malfunction of the in-vehicle device 44 by maintaining the in-vehicle device 44 in an appropriate temperature range.

As shown in FIG. 1, the second evaporator 24 constitutes a part of the heat medium circuit 40 to exchange heat between the cooling water as the heat medium and the external heat source (i.e., outside air or in-vehicle device 44).

In the heating mode and the device cooling mode, the heat medium circuit 40 causes the cooling water to absorb heat of the external heat source. The second evaporator 24 causes the low-pressure refrigerant to absorb the heat of the cooling water in the heat medium circuit 40. The refrigeration cycle device 10 having this configuration can achieve further appropriate heat management on the low-temperature side.

In the heating mode, the heating unit 30 radiates heat of the high-pressure refrigerant discharged from the discharge port 11c to supply heat for heating the blown air as heat exchange target fluid. Accordingly, the refrigeration cycle device 10 can achieve comfortable heating by radiation of heat from the high-pressure refrigerant in the gas injection cycle.

In this case, any configuration may be adopted as long as heat sufficient for finally heating the blown air as heat exchange target fluid can be obtained. Accordingly, a configuration in which cooling water in the heating unit 30 is interposed (i.e., configuration of the heating unit 30 in the first embodiment), or a configuration in which direct heat exchange is performed between the high-pressure refrigerant and the blown air (so-called interior condenser) may be adopted.

The heating unit 30 of the refrigeration cycle device 10 herein includes the heat medium circulation path 31, the refrigerant radiator 12, and the heater core 33. In the heating mode, heat radiated from the high-pressure refrigerant to the cooling water at the refrigerant radiator 12 is radiated to the blown air as the heat exchange target fluid at the heater core 33.

This configuration of the heating unit 30 as a cooling water circuit through which cooling water circulates as a heat medium allows utilization of a configuration of a vehicle air conditioner including a heater core for heat exchange with engine cooling water. Accordingly, the refrigeration cycle device 10 can use constituent devices common to other refrigeration cycle devices, thereby reducing a manufacturing cost.

The heating unit 30 of the refrigeration cycle device 10 herein includes the heat medium circulation path 31, the refrigerant radiator 12, and the radiator 34. In the cooling mode, heat radiated from the high-pressure refrigerant to the cooling water at the refrigerant radiator 12 is radiated to the outside air.

According to the refrigeration cycle device 10 having this configuration, a surplus heat amount in the cooling mode can be radiated to the outside air through the radiator 34, thereby achieving secure cooling for the vehicle interior.

In the heating mode, the controller 60 controls the throttle opening position of at least one of the high-stage side expansion valve 13, the first expansion valve 19, and the second expansion valve 23 such that the refrigerant flow amount ratio in the heating mode becomes smaller than the refrigerant flow amount ratio in the cooling mode.

The refrigerant flow amount ratio refers to a ratio of an amount of the refrigerant sucked through the suction port 11a of the compressor 11 to an amount of the refrigerant discharged from the discharge port 11c of the compressor 11.

In the heating mode, suction refrigerant density sucked from the suction port 11a is smaller than the corresponding suction refrigerant density in the cooling mode. In this case, heat exchange performance of the refrigerant radiator 12 improves by reducing the refrigerant flow amount ratio in the heating mode to a ratio smaller than the refrigerant flow amount ratio in the cooling mode, wherefore cycle performance improves.

Second Embodiment

Figure 3:
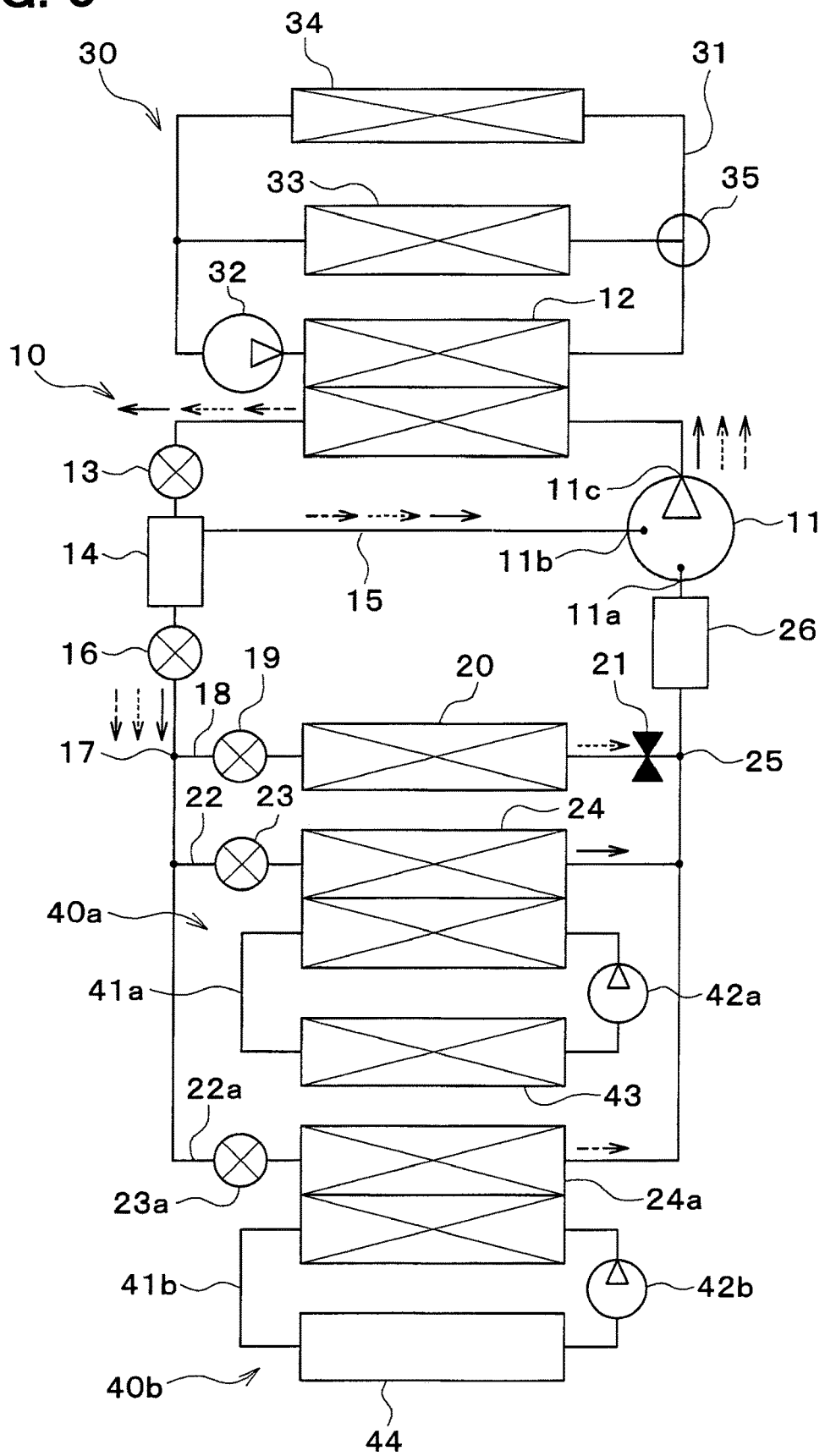
FIG. 3 is a schematic configuration diagram of a refrigeration cycle device according to at least one embodiment of the present disclosure.

A second embodiment different from the first embodiment described above will be subsequently described with reference to FIG. 3. The refrigeration cycle device 10 according to the second embodiment constitutes the vehicle air conditioner 1 for an electric vehicle in cooperation with the interior air conditioning unit 50 similarly to the first embodiment. FIG. 3 does not show a specific configuration of the interior air conditioning unit 50.

As shown in FIG. 3, the refrigeration cycle device 10 of the second embodiment is configured to switch between a plurality of operation modes including a cooling mode for cooling the vehicle interior, a heating mode for heating the vehicle interior, and a device cooling mode for cooling the in-vehicle device 44 and the like.

In FIG. 3, a flow of a refrigerant in the heating mode is indicated by solid arrows, and a flow of the refrigerant in the cooling mode is indicated by broken arrows. A flow of the refrigerant in the device cooling mode is indicated by one-dot-chain arrows.

The refrigeration cycle device 10 according to the second embodiment includes a gas injection cycle (economizer type refrigeration cycle), the heating unit 30, an outside air heat absorbing circuit 40a, and a device heat absorbing circuit 40b. The heating unit 30 according to the second embodiment has a configuration similar to the corresponding configuration of the first embodiment described above.

Accordingly, the heating unit 30 is not described in detail.

As shown in FIG. 3, the gas injection cycle of the refrigeration cycle device 10 is a cycle in which the compressor 11, the refrigerant radiator 12, the high-stage side expansion valve 13, the gas-liquid separator 14, the low-stage side fixed throttle 16, the first expansion valve 19, the first evaporator 20, the evaporation pressure control valve 21, the second expansion valve 23, the second evaporator 24, a third expansion valve 23a, a third evaporator 24a, and the liquid storage unit 26 are connected.

In the refrigeration cycle device 10 according to the second embodiment, a configuration from the discharge port 11c of the compressor 11 to the refrigerant branch portion 17, a configuration from the refrigerant junction portion 25 to the suction port 11a of the compressor 11, and a configuration from the gas-liquid separator 14 to the intermediate pressure port 11b of the compressor 11 are similar to the corresponding configurations of the first embodiment described above. Accordingly, these configurations are not repeatedly described.

According to the refrigeration cycle device 10 of the second embodiment, a configuration between the refrigerant branch portion 17 and the refrigerant junction portion 25 is different from the corresponding configuration of the first embodiment. Accordingly, these differences will be touched upon with reference to the drawings.

The refrigerant branch portion 17 of the second embodiment includes one refrigerant flow inlet and three refrigerant flow outlets, and branches a flow of the refrigerant having flowed from the low-stage side fixed throttle 16 into three flows. One of the refrigerant flow outlets of the refrigerant branch portion 17 is connected to the first parallel flow path 18, while another of the refrigerant flow outlets is connected to the second parallel flow path 22. Further one of the refrigerant flow outlets of the refrigerant branch portion 17 is connected to a third parallel flow path 22a.

According to the second embodiment, the first expansion valve 19, the first evaporator 20, and the evaporation pressure control valve 21 are disposed in the first parallel flow path 18, while the second expansion valve 23 and the second evaporator 24 are disposed in the second parallel flow path 22. These points are similar to the corresponding points in the first embodiment, and therefore are not described in detail.

As shown in FIG. 3, the third expansion valve 23a and the third evaporator 24a are disposed in the third parallel flow path 22a. Similarly to the first expansion valve 19 and the second expansion valve 23, the third expansion valve 23a includes a valve body configured to change a throttle opening position, and an electric actuator for changing the opening position of the valve body to constitute an electrically variable throttle mechanism.

Similarly to the first expansion valve 19 and the second expansion valve 23, the third expansion valve 23a can perform the throttling function, the full-opening function, and the full-closing function by appropriately controlling the valve opening position between the full-open state and the full-close state. In this manner, the third expansion valve 23a can decompress the refrigerant having flowed into the third parallel flow path 22a until the refrigerant becomes a low-pressure refrigerant, and causes the low-pressure refrigerant to flow out.

The first expansion valve 19, the second expansion valve 23, and the third expansion valve 23a cooperate with each other to perform a function of controlling the flow rate of the refrigerant passing through the first parallel flow path 18, the second parallel flow path 22, and the third parallel flow path 22a. Moreover, each of the first expansion valve 19, the second expansion valve 23, and the third expansion valve 23a performs a flow path switching function when further equipped with an expansion valve for achieving a full-closing function.

The refrigerant inlet side of the third evaporator 24a is connected to a refrigerant flow outlet of the third expansion valve 23a via the third parallel flow path 22a. As shown in FIG. 3, the third evaporator 24a is a heat exchanger which constitutes a part of a device heat absorbing circuit 40b described below, and absorbs heat of a heat medium (i.e., cooling water) circulating in the heat medium circuit 40 by evaporating the low-pressure refrigerant circulating inside the third evaporator 24a to cause heat absorption.

The refrigerant junction portion 25 according to the third embodiment includes a plurality of refrigerant flow inlets and one refrigerant flow outlet to join a flow of the refrigerant having passed through the first parallel flow path 18, a flow of the refrigerant having passed through the second parallel flow path 22, and a flow of the refrigerant having passed through the third parallel flow path 22a into one flow. According to the second embodiment, the liquid storage unit 26 is disposed at the refrigerant flow outlet of the refrigerant junction portion 25 similarly to the first embodiment.

A configuration of the outside air heat absorbing circuit 40a according to the second embodiment will be next described with reference to FIG. 3. The outside air heat absorbing circuit 40a is a low-temperature side heat medium circuit which includes the second evaporator 24 constituting a part of the gas injection cycle, a heat medium circulation path 41a as a heat medium flow path, a pressure pump 42a, and the radiator 43.

As shown in FIG. 3, the outside air heat absorbing circuit 40a is constituted by the second evaporator 24 and the radiator 43 connected by the heat medium circulation path 41a, and configured to supply circulate cooling water as a heat medium with pressure using the pressure pump 42a to circulate the cooling water.

The cooling water in the outside air heat absorbing circuit 40a is a low-temperature heat medium, and constituted by a liquid containing at least ethylene glycol, dimethylpolysiloxane or a nanofluid, or an antifreeze liquid, for example.

The pressure pump 42a functioning as a heat medium pump for sucking and discharging cooling water as a heat medium is constituted by an electric pump similarly to the pressure pump 42 of the first embodiment.

The second evaporator 24 is connected to the discharge opening side of the pressure pump 42a. Accordingly, the second evaporator 24 can achieve heat exchange between the low-pressure refrigerant passing through the inside of the second evaporator 24 and the cooling water circulating through the heat medium circulation path 41a to causes the low-pressure refrigerant to absorb heat of the cooling water.

The radiator 43 is connected to the cooling water flow outlet side of the second evaporator 24. Similarly to the first embodiment, the radiator 43 is a heat exchanger which exchanges heat between the cooling water circulating through the heat medium circulation path 41a of the outside air heat absorbing circuit 40a and the outside air to cause the cooling water to absorb heat of the outside air. Accordingly, the outside air heat absorbing circuit 40a is configured to circulate the cooling water via the radiator 43 to utilize the outside air of the electric vehicle as an external heat source.

A configuration of the device heat absorbing circuit 40b according to the second embodiment will be subsequently described with reference to FIG. 3. The device heat absorbing circuit 40b is a low-temperature side heat medium circuit which includes the third evaporator 24a which constitutes a part of the gas injection cycle, a heat medium circulation path 41b as a heat medium flow path, a pressure pump 42b, and the in-vehicle device 44.

As shown in FIG. 3, the device heat absorbing circuit 40b includes the third evaporator 24a and the in-vehicle device 44 connected by the heat medium circulation path 41b, and supplies cooling water as a heat medium with pressure using the pressure pump 42b to circulate the cooling water.

The cooling water in the device heat absorbing circuit 40b is a low-temperature heat medium, and constituted by a liquid containing at least ethylene glycol, dimethylpolysiloxane or a nanofluid, or an antifreeze liquid, for example.

The pressure pump 42b functioning as a heat medium pump for sucking and discharging cooling water as a heat medium is constituted by an electric pump similarly to the pressure pump 42 of the first embodiment.

The third evaporator 24a is connected to a discharge opening side of the pressure pump 42b. Accordingly, the third evaporator 24a can achieve heat exchange between the low-pressure refrigerant passing through the inside of the third evaporator 24a and the cooling water circulating through the heat medium circulation path 41b to cause the low-pressure refrigerant to absorb heat of the cooling water.

The in-vehicle device 44 is connected to the cooling water flow outlet side of the third evaporator 24a. Similarly to the first embodiment, the in-vehicle device 44 is mounted on an electric vehicle, and constituted by a device which generates heat in accordance with operation. The heat medium circulation path 41b of the device heat absorbing circuit 40b is so disposed as to come into contact with outer surfaces of respective parts of the in-vehicle device 44, and configured to achieve heat exchange between heat of the in-vehicle device 44 and the cooling water flowing through the heat medium path.

Accordingly, the device heat absorbing circuit 40b is configured to circulate the cooling water via the in-vehicle device 44 to utilize the in-vehicle device 44 of the electric vehicle as an external heat source. In this case, the device heat absorbing circuit 40b causes the cooling water to absorb heat of the in-vehicle device 44, and therefore achieves cooling of the in-vehicle device 44.

The refrigeration cycle device 10 according to the second embodiment configured as described above implements operation modes, i.e., the cooling mode, the heating mode, and the device cooling mode using the gas injection cycle similarly to the first embodiment. The aspect of control of the cooling mode in the second embodiment is similar to the corresponding aspect of the first embodiment, and therefore will not be repeatedly described.

In the heating mode of the second embodiment, the controller 60 brings the high-stage side expansion valve 13 into the throttling state, and the first expansion valve 19 into the full-close state. At least one of the second expansion valve 23 and the third expansion valve 23a is brought into the throttling state. Both the second expansion valve 23 and the third expansion valve 23a may be brought into the throttling state.

In this case, the heat medium circuit (i.e., outside air heat absorbing circuit 40a or device heat absorbing circuit 40b) corresponding to the expansion valve in the throttling state, i.e., the second expansion valve 23 or the third expansion valve 23a, causes the cooling water to absorb heat from the external heat source.

In the heating unit 30 in this case, the three-way valve 35 is controlled such that the cooling water having flowed from the refrigerant radiator 12 flows into the heater core 33. The air mix door 54 of the interior air conditioning unit 50 is so controlled as to close the bypass path 55.

By this control, the refrigeration cycle device 10 of the second embodiment can produce a state similar to the heating mode of the first embodiment, and achieves heating of the vehicle interior by utilizing the outside air or the in-vehicle device 44 as the external heat source.

A case of the device cooling mode of the second embodiment will be next described. In this case, the controller 60 brings the high-stage side expansion valve 13 and the third expansion valve 23a into the throttling state, and the first expansion valve 19 and the second expansion valve 23 into the full-close state.

At this time, the device heat absorbing circuit 40b corresponding to the third expansion valve 23a in the throttling state causes the cooling water to absorb heat from the in-vehicle device 44 by operation of the pressure pump 42b. In this manner, the in-vehicle device 44 is cooled by heat exchange between the in-vehicle device 44 and the cooling water. In the heating unit 30, the three-way valve 35 is controlled such that the cooling water having flowed from the refrigerant radiator 12 flows into the radiator 34.

By this control, the refrigeration cycle device 10 of the second embodiment can produce a state similar to the device cooling mode of the first embodiment, and cool the in-vehicle device 44 to use the in-vehicle device 44 in an appropriate temperature range.

According to the refrigeration cycle device 10 of the second embodiment described above, the first expansion valve 19 and the first evaporator 20, the second expansion valve 23 and the second evaporator 24, and the third expansion valve 23a and the third evaporator 24a are connected to the three refrigerant flow outlets of the refrigerant branch portion 17, respectively, and disposed in parallel to each other.

In this case, the heating unit 30 radiates heat of the high-pressure refrigerant, while the first evaporator 20, the second evaporator 24, and the third evaporator 24a cause the low-pressure refrigerant to absorb the heat in any of the cooling mode, the heating mode, and the device cooling mode.

According to the refrigeration cycle device 10, therefore, high and low pressures on the Mollier diagram for the refrigerant radiator 12 of the heating unit 30, the first evaporator 20, the second evaporator 24, and the third evaporator 24a are not switched in accordance with the operation mode. Accordingly, the circuit configuration can be simplified.

Furthermore, the gas-liquid separator 14 is disposed between the high-stage side expansion valve 13 and the refrigerant branch portion 17 in the refrigeration cycle device 10. In this case, the gas-phase refrigerant produced by gas-liquid separation is guided to the intermediate pressure port 11b of the compressor 11 to produce a gas injection cycle.

The refrigeration cycle device 10 in which high and low pressures on the Mollier diagram are not switched in accordance with the operation mode can produce a gas injection cycle in any of the cooling mode, the heating mode, and the device cooling mode. In this case, performance improvement of the refrigeration cycle device 10 is achievable, such as improvement of compression efficiency of the compressor 11.

Accordingly, the refrigeration cycle device 10 can simplify the circuit configuration, and produce the gas injection cycle for each of the cooling mode, the heating mode, and the device cooling mode, thereby improving cycle performance in each of the operation modes.

Third Embodiment

A third embodiment different from the respective embodiments described above will be subsequently described with reference to FIG. 4. The refrigeration cycle device 10 according to the third embodiment constitutes the vehicle air conditioner 1 for an electric vehicle in cooperation with the interior air conditioning unit 50 similarly to the first embodiment.

The refrigeration cycle device 10 according to the third embodiment is configured to switch between a plurality of operation modes including the cooling mode, the heating mode, and the device cooling mode. As shown in FIG. 4, the refrigeration cycle device 10 according to the third embodiment is configured similarly to the first embodiment except that an integrated evaporator 70 is disposed instead of the second evaporator 24 of the first embodiment.

Accordingly, a configuration of the integrated evaporator 70 which is a difference point will be hereinafter described. Other configurations of the refrigeration cycle device 10 according to the third embodiment will be not be described.

Figure 4:
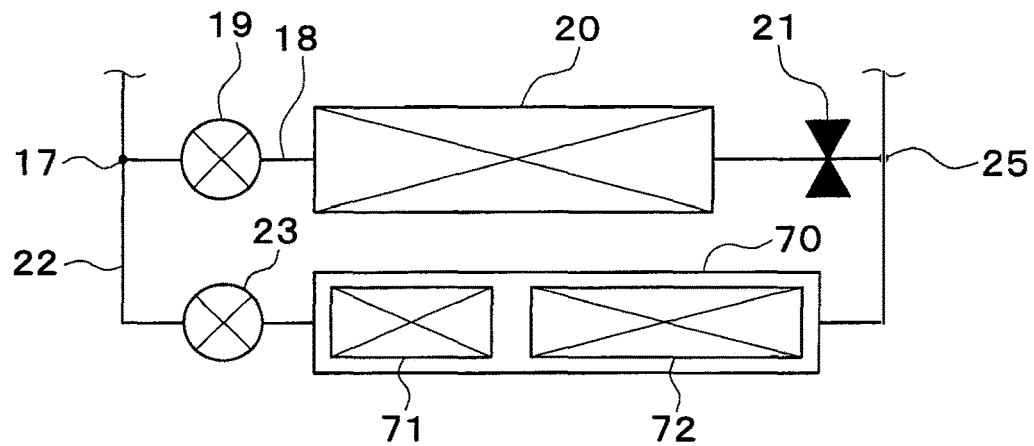
FIG. 4 is a configuration diagram of a region around a refrigerant branch portion of a refrigeration cycle device according to at least one embodiment of the present disclosure.

As shown in FIG. 4, the integrated evaporator 70 according to the third embodiment is disposed in the second parallel flow path 22 branched at the refrigerant branch portion 17 of the refrigeration cycle device 10. The refrigerant inlet side of of the integrated evaporator 70 is connected to the refrigerant flow outlet of the second expansion valve 23. The integrated evaporator 70 is an evaporator constituted by an outside air side heat exchange unit 71 and a device side heat exchange unit 72 integrated with each other.

The outside air side heat exchange unit 71 is a heat exchange unit for absorbing heat from the outside air as an external heat source, and performs a function similar to the function of the second evaporator 24 of the second embodiment. The device side heat exchange unit 72 is a heat exchange unit for absorbing heat from the in-vehicle device 44 as an external heat source, and performs a function similar to the function of the third evaporator 24a of the second embodiment.

The integrated evaporator 70 may have a structure constituted by a plurality of evaporators corresponding to the outside air side heat exchange unit 71 and the device side heat exchange unit 72 assembled and integrated with each other, or may include the outside air side heat exchange unit 71 and the device side heat exchange unit 72 functionally separated from each other by changing a flow path configuration of a heat exchange unit of one evaporator.

According to the refrigeration cycle device 10 of the third embodiment, therefore, the integrated evaporator 70 including the outside air side heat exchange unit 71 and the device side heat exchange unit 72 is connected to the refrigerant flow outlet side of the second expansion valve 23. Accordingly, the single integrated evaporator 70 can be applied to both heat absorption from the outside air and heat absorption from and cooling of the in-vehicle device 44.

Moreover, according to the integrated evaporator 70 which includes the outside air side heat exchange unit 71 and the device side heat exchange unit 72 integrated with each other, the number of assembling steps and the like for the integrated evaporator 70 can be more reduced than in a case where the evaporator for outside air heat absorption and the evaporator for device heat absorption are separately assembled. Accordingly, manufacturing costs of the vehicle air conditioner 1 and the refrigeration cycle device 10 can be reduced.

When the integrated evaporator 70 is adopted, a part of constituent parts of the evaporator for outside air heat absorption is also used as a part of constituent parts of the evaporator for device heat absorption. Accordingly, more reduction of the constituent parts is achievable than in a configuration in which an evaporator for outside air heat absorption and an evaporator for device heat absorption are individually assembled, wherefore reduction of weights of the refrigeration cycle device 10 and the like is achievable.

Fourth Embodiment

Figure 5:
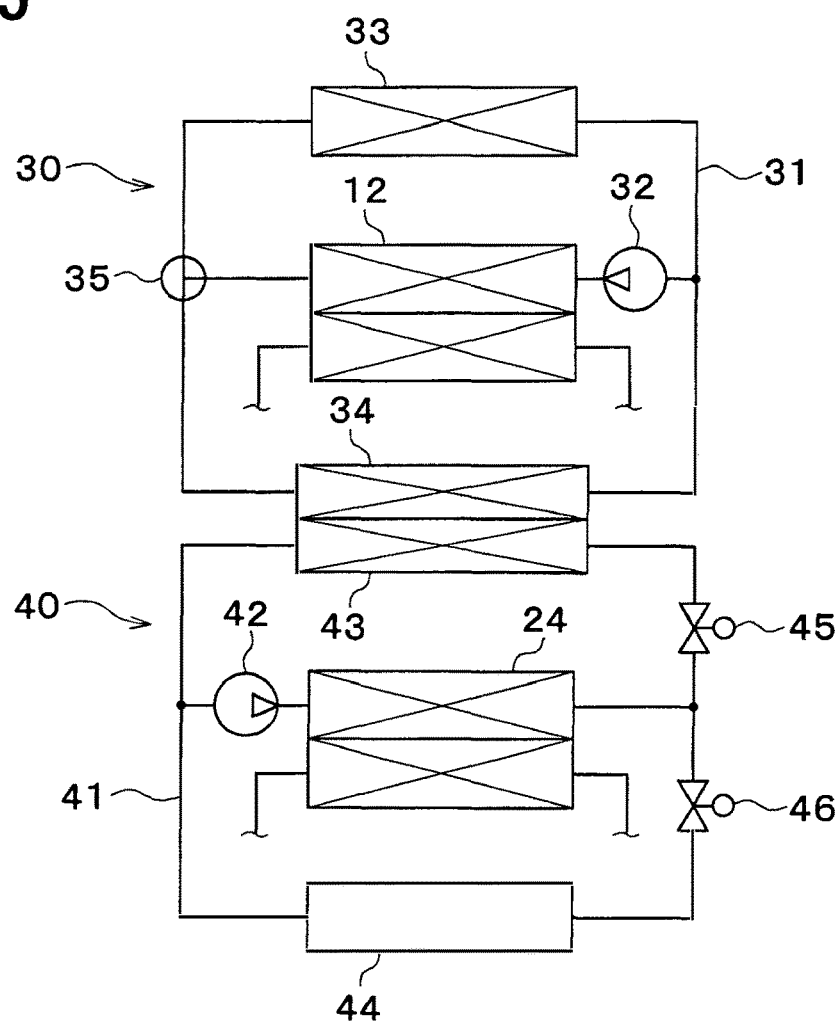
FIG. 5 is a configuration diagram of a heating unit and a heat medium circuit of a refrigeration cycle device according to at least one embodiment of the present disclosure.

A fourth embodiment different from the respective embodiments described above will be subsequently described with reference to FIG. 5. The refrigeration cycle device 10 according to the fourth embodiment constitutes the vehicle air conditioner 1 for an electric vehicle in cooperation with the interior air conditioning unit 50 similarly to the first embodiment.

The refrigeration cycle device 10 according to the fourth embodiment is configured to switch between a plurality of operation modes including the cooling mode, the heating mode, and the device cooling mode. The refrigeration cycle device 10 according to the fourth embodiment is configured similarly to the first embodiment except for the configurations of the heating unit 30 as the high-temperature side heat medium circuit and the heat medium circuit 40 as the low-temperature side heat medium circuit of the first embodiment.

Accordingly, different points of the heating unit 30 and the heat medium circuit 40 will be hereinafter described. Other configurations of the refrigeration cycle device 10 according to the fourth embodiment will be not be described.

According to the fourth embodiment, the heating unit 30 includes the refrigerant radiator 12 constituting a part of a gas injection cycle, the heat medium circulation path 31, the pressure pump 32, the heater core 33, the radiator 34, and the three-way valve 35. Constituent devices of the heating unit 30 according to the fourth embodiment are configured similarly to the corresponding constituent parts of the first embodiment except for the radiator 34.

The heat medium circuit 40 according to the fourth embodiment includes the second evaporator 24 which constitutes a part of the gas injection cycle, the heat medium circulation path 41, the pressure pump 42, the radiator 43, the in-vehicle device 44, the on-off valve 45, and the on-off valve 46. Constituent devices of the heat medium circuit 40 according to the fourth embodiment are configured similarly to the corresponding constituent parts of the first embodiment except for the radiator 43.

According to the fourth embodiment, the radiator 34 of the heating unit 30 is disposed upstream side or downstream side of the radiator 43 of the heat medium circuit 40 in a flow of the outside air produced by a not-shown blower fan. The radiator 34 is coupled to the radiator 43 via fins, and is configured to transfer heat between the cooling water circulating through the radiator 34 and the cooling water circulating through the radiator 43.

According to the refrigeration cycle device 10 of the fourth embodiment, therefore, the radiator 34 of the heating unit 30 and the radiator 43 of the heat medium circuit 40 are coupled to each other via the fins. In this case, heat transfer is achievable between the cooling water circulating through the heating unit 30 as a high-temperature heat medium circuit and the cooling water circulating through the heat medium circuit 40 as a low-temperature heat medium circuit. Accordingly, the refrigeration cycle device 10 can effectively utilize heat generated by the heating unit 30 and the heat medium circuit 40 of the refrigeration cycle device 10.

In the fourth embodiment, the radiator 34 and the radiator 43 are coupled by the fins. However, the functions of the radiator 34 and the radiator 43 may be performed by one radiator. In this case, the heat medium circulation path 31 and the heat medium circulation path 41 are connected to each other to allow flow-in and flow-out of the heat medium. In addition, an on-off valve for controlling flow-in and flow-out of the heat medium is provided.

The present disclosure described above based on the respective embodiments is not limited to the embodiments in any way. Accordingly, various improvements and modifications may be made without departing from the scope of the present disclosure. For example, the respective embodiments described herein may be combined as appropriate, or may be modified in various manners.

The external heat source from which heat is absorbed by the second evaporator 24 or the third evaporator 24*a* in the embodiments described above is not limited to the outside air or the in-vehicle device 44. Similarly, for example, the in-vehicle device 44 is not limited to the device described above, but may be various other heat sources such as a battery for vehicle travelling and a vehicle engine.

In the embodiment described above, the heating unit 30 constitutes the high-temperature side heat medium circuit, and radiates heat of the high-pressure refrigerant to the outside air or the blown air as the heat exchange target fluid via the cooling water as the heat medium. However, this mode is not required to be adopted. For example, an interior condenser may be employed instead of the refrigerant radiator 12 of the embodiments described above, and provided as the heating unit of the present disclosure.

In the embodiments described above, the liquid storage unit 26 is disposed between the refrigerant junction portion 25 and the suction port 11*a* of the compressor 11. However, this mode is not required to be adopted. For example, the liquid storage unit 26 may be disposed on the downstream side of the gas-liquid separator 14 and the low-stage side fixed throttle 16, and on the upstream side of the refrigerant branch portion 17.

In the embodiments described above, the evaporation pressure control valve 21 is disposed on the refrigerant flow downstream side of the first evaporator 20 in the first parallel flow path 18. However, this mode is not required to be adopted. The evaporation pressure control valve 21 may be eliminated from the refrigeration cycle device 10 depending on combinations of the operation modes to be adopted.

In the embodiments described above, the low-stage side fixed throttle 16 is disposed at the liquid-phase refrigerant outlet of the gas-liquid separator 14. However, this mode is not required to be adopted. The low-stage side fixed throttle 16 may be eliminated from the refrigeration cycle device 10 as long as decompression to a desired low-pressure refrigerant can be achieved by controlling the opening positions of the first expansion valve 19 and the second expansion valve 23.

It should be understood that the present disclosure described based on the embodiments is not limited to the embodiments or structures presented herein. The present disclosure also includes various modifications and variations within an equivalent range. In addition, not only various combinations and modes presented in the present disclosure, but also other combinations and modes including only a single element, or more or less elements, are all included in the scope and the range of spirit of the present disclosure.

What is claimed is:

1. A refrigeration cycle device comprising:
a compressor configured to compress a low-pressure refrigerant drawn from a suction port such that the low-pressure refrigerant becomes a high-pressure refrigerant and to discharge the high-pressure refrigerant from a discharge port, the compressor having an intermediate pressure port through which an intermediate-pressure refrigerant in a cycle flows into the compressor and joins the refrigerant in a compression process;
a heater device configured to heat a heat exchange target fluid using the high-pressure refrigerant discharged from the discharge port of the compressor as a heat source;
a high-stage side decompressor configured to decompress the high-pressure refrigerant flowing out of the heater device such that the high-pressure refrigerant becomes the intermediate-pressure refrigerant;
a gas-liquid separator configured to
separate the intermediate-pressure refrigerant decompressed at the high-stage side decompressor into a gas refrigerant and a liquid refrigerant and
allow the gas-refrigerant to flow to the intermediate pressure port of the compressor;
a refrigerant branch portion configured to divide a flow of the liquid refrigerant separated by the gas-liquid separator into one flow and another flow;
a first decompressor configured to decompress the liquid refrigerant of the one flow such that the liquid refrigerant becomes the low-pressure refrigerant;
a first evaporator configured to
evaporate the low-pressure refrigerant decompressed by the first decompressor by allowing the low-pressure refrigerant to absorb heat of the heat exchange target fluid and
allow the evaporated refrigerant to flow to the suction port of the compressor;
a second decompressor configured to decompress the liquid refrigerant of the other flow such that the liquid refrigerant becomes the low-pressure refrigerant; and
a second evaporator configured to
evaporate the low-pressure refrigerant decompressed by the second decompressor by allowing the low-pressure refrigerant to absorb heat of an external heat source and allow the evaporated refrigerant to flow to the suction port of the compressor, wherein in a cooling mode for cooling the heat exchange target fluid, a refrigerant circuit is switched such that the low-pressure refrigerant flows from the refrigerant branch portion into the first evaporator, and in a heating mode for heating the heat exchange target fluid, the refrigerant circuit is switched such that the low-pressure refrigerant flows from the refrigerant branch portion into the second evaporator.

2. The refrigeration cycle device according to claim 1, wherein
the external heat source is an outside air.

3. The refrigeration cycle device according to claim 2, further comprising:
a third evaporator connected to the refrigerant branch portion in parallel with the second evaporator, wherein
the third evaporator is configured to
evaporate the liquid refrigerant of the other flow by allowing the liquid refrigerant to absorb heat of a heat generating device configured to generate heat during operation and
allow the evaporated refrigerant to flow to the suction port of the compressor, and
in the heating mode, the refrigerant circuit is switched such that the low-pressure refrigerant flows from the refrigerant branch portion into at least one of the second evaporator or the third evaporator.

4. The refrigeration cycle device according to claim 1, wherein
the external heat source is a heat generating device configured to generate heat during operation.

5. The refrigeration cycle device according to claim 1, wherein
the second evaporator constitutes a part of a heat medium circuit in which a heat medium circulates,
the heat medium circuit includes a heat exchanger configured to exchange heat between the heat medium and the external heat source,
the heat exchanger is configured to allow the heat medium to absorb the heat of the external heat source in the heating mode,
the second evaporator is configured to allow the refrigerant flowing through the second evaporator to absorb heat of the heat medium.

6. The refrigeration cycle device according to claim 1, wherein
the heater device is configured to supply heat for heating the heat exchange target fluid by causing the high-pressure refrigerant discharged from the discharge port of the compressor to release heat of the high-pressure refrigerant in the heating mode.

7. The refrigeration cycle device according to claim 6, wherein
the heater device includes
a heat medium passage through which the heat medium flows,
a medium-refrigerant heat exchanger configured to exchange heat between the high-pressure refrigerant discharged from the discharge port of the compressor and the heat medium flowing through the heat medium passage, and
a heater core configured to exchange heat between the heat medium and the heat exchange target fluid in the heating mode.

8. The refrigeration cycle device according to claim 6, wherein
the heater device includes
a heat medium passage through which the heat medium flows,
a medium-refrigerant heat exchanger configured to exchange heat between the high-pressure refrigerant discharged from the discharge port of the compressor and the heat medium flowing through the heat medium passage, and
a radiator configured to release excess heat of the heat medium to an outside air in the cooling mode.

9. The refrigeration cycle device according to claim 1, wherein a refrigerant flow rate proportion is a proportion of a flow rate of the refrigerant drawn into the compressor from the suction port in a flow rate of the refrigerant discharged from the discharge port of the compressor, the refrigeration cycle device further comprises: a controller configured to control the first decompressor and the second compressor such that the refrigerant flow rate proportion in the heating mode is smaller than the refrigerant flow rate proportion in the cooling mode.

* * * * *